United States Patent [19]

Tanio et al.

[11] Patent Number: 5,465,165

[45] Date of Patent: Nov. 7, 1995

[54] IMAGE PROCESSING SYSTEM

[75] Inventors: Staoshi Tanio, Tokyo; Naoto Arakawa, Yokohama, both of Japan

[73] Assignee: Canon Kabushiki Kaisha, Tokyo, Japan

[21] Appl. No.: 895,801

[22] Filed: Jun. 9, 1992

[30] Foreign Application Priority Data

| Jun. 11, 1991 | [JP] | Japan | 3-139087 |
| Jul. 31, 1991 | [JP] | Japan | 3-192044 |

[51] Int. Cl.⁶ ............................ H04N 1/00; G06F 15/62
[52] U.S. Cl. ........................ 358/448; 395/109; 395/125
[58] Field of Search ........................ 358/448, 183, 358/263, 22, 280, 445, 284, 446, 283, 447; 395/101, 112, 200, 135, 127; 364/900, 200, 519, 521, 518, 522, 235, 930, 964, 222.2, 222.3; 382/33, 48, 44

[56] References Cited

U.S. PATENT DOCUMENTS

| 4,071,909 | 1/1978 | Geller | 364/900 |
| 4,675,745 | 6/1987 | Riseman et al. | 358/263 |
| 4,677,571 | 6/1987 | Riseman et al. | 358/263 X |
| 4,779,105 | 10/1988 | Thomson et al. | 364/154 |
| 4,949,188 | 8/1990 | Sato | 358/448 |
| 4,992,958 | 2/1991 | Kageyama et al. | 364/519 |
| 5,020,004 | 5/1991 | Igarashi | 364/519 |
| 5,045,967 | 9/1991 | Igarashi | 364/518 |
| 5,060,280 | 10/1991 | Mita et al. | 382/33 |
| 5,075,874 | 12/1991 | Steeves et al. | 395/112 |
| 5,129,061 | 7/1992 | Wang et al. | 395/200 |
| 5,179,642 | 1/1993 | Komatsu | 395/135 |
| 5,255,352 | 10/1993 | Falk | 395/125 |
| 5,315,691 | 5/1994 | Sumiya et al. | 395/109 |

FOREIGN PATENT DOCUMENTS

| 262801 | 4/1988 | European Pat. Off. | H04N 1/387 |
| 62-016158 | 1/1987 | Japan | B41J 3/10 |
| 2296465 | 5/1989 | Japan | H04N 1/387 |
| 1278167 | 1/1990 | Japan | H04N 1/21 |

*Primary Examiner*—Paul Ip
*Attorney, Agent, or Firm*—Fitzpatrick, Cella, Harper & Scinto

[57] ABSTRACT

An image processing system includes a printer engine (3) corresponding to one or both of binary and multi-value data, and a plurality of memory devices (1a, 1b) for storing bit map data and supplying a binary or multi-value video signal to the printer engine, and an interface (7) for connecting the plurality of memory devices (1a, 1b) to the engine (3). Binary or multi-value data is read out from an arbitrary memory device, two different binary data, two different multi-value data, or binary data and multi-value data are synthesized, and the synthesized data is printed. Processing, which is conventionally performed by a single memory device, can be separately performed by the plurality of memory devices, thus increasing the processing speed. Various processing operations such as binary-multi-value synthesizing processing can easily be performed.

25 Claims, 18 Drawing Sheets

FLOWCHART OF I/O
IN EMBODIMENT 3

DIGITAL COLOR COPIER STRUCTURE

IMAGE MEMORY SYNTHESIZING APPARATUS STRUCTURE

SYNTHESIZING PDL DATA WITH MEMORY IMAGE

IMAGE MEMORY SYNTHESIZING APPARATUS STRUCTURE

IMAGE PROCESSING SYSTEM

BACKGROUND OF THE INVENTION

1. Field of the Invention

The present invention relates to an image processing system having a plurality of image signal generation sources each having a storage means for storing an image signal to be supplied to a single printer engine and, more particularly, to an image processing system, which can process both a character code and a multi-value image.

2. Related Background Art

Conventionally, a single printer engine is connected to a single image signal generation source, having a storage means, for transmitting bit map data to the printer engine, or they are integrally arranged.

However, in the prior art, since the printer engine and the image signal generation source have a one-to-one correspondence therebetween, the following problems are posed.

(1) In the case of an image signal generation source having an interpreter function for a page description language, since the single image signal generation source performs data development for one page, the processing speed is limited.

(2) When the image signal generation source can only process binary data, even when the printer engine can receive multi-value data, a print operation based on the multi-value data cannot be performed, and the performance of the printer engine cannot be sufficiently utilized.

In recent years, a printer system, which interprets codes or commands defined to express a document, image, or the like, which is created and converted by a computer, and outputs the document, image, or the like after image development corresponding to the resolution of a printer, has become popular.

However, since a printer system of this type performs the same processing for a vector-converted command image data portion such as a document, illustration, or the like in a PDL code as a code or command for defining a document or image created for a printer, and for a multi-value raster image data portion such as a natural image, these image data portions cannot be synthesized by optimal processing for generation of these images. For example, since multi-value raster image data is converted into, e.g., binary data like in character or illustration data, and is buffered in a page memory, image quality is often deteriorated.

Upon processing of the above-mentioned raster multi-value data and command image data portions, if these portions are processed in correspondence with the resolution of the raster multi-value data and the capacity of the image data, image quality can be improved. However, this method makes the arrangement of the entire system complex, and decreases the data processing speed.

SUMMARY OF THE INVENTION

It is an object of the present invention to provide an image processing system, which can solve all or at least one of the above-mentioned problems.

It is another object of the present invention to provide an image processing system capable of performing high-speed processing.

It is still another object of the present invention to provide an image processing apparatus which can satisfactorily process both an image and a character portion.

In order to achieve the above objects, according to a preferred aspect of the present invention, there is disclosed an image processing system having a plurality of image signal generation means each including storage means for storing an image signal to be supplied to a single printer engine, comprising means for connecting the printer engine and the plurality of image signal generation means, and means for selectively synthesizing image signals from arbitrary image signal generation means.

It is still another object of the present invention to provide an image processing system, which can reproduce an image according to a command described in a page description language.

It is still another object of the present invention to provide an image processing system, which can satisfactorily process a command described in a page description language, and can perform edit processing of an image according to the command.

It is still another object of the present invention to provide an image processing apparatus and a reproduction apparatus, which constitute each of the above-mentioned systems.

The above and other objects and features of the present invention will become apparent from the following description of the embodiments taken in conjunction with the accompanying drawings.

DETAILED DESCRIPTION OF THE PREFERRED EMBODIMENTS

Figure 1:
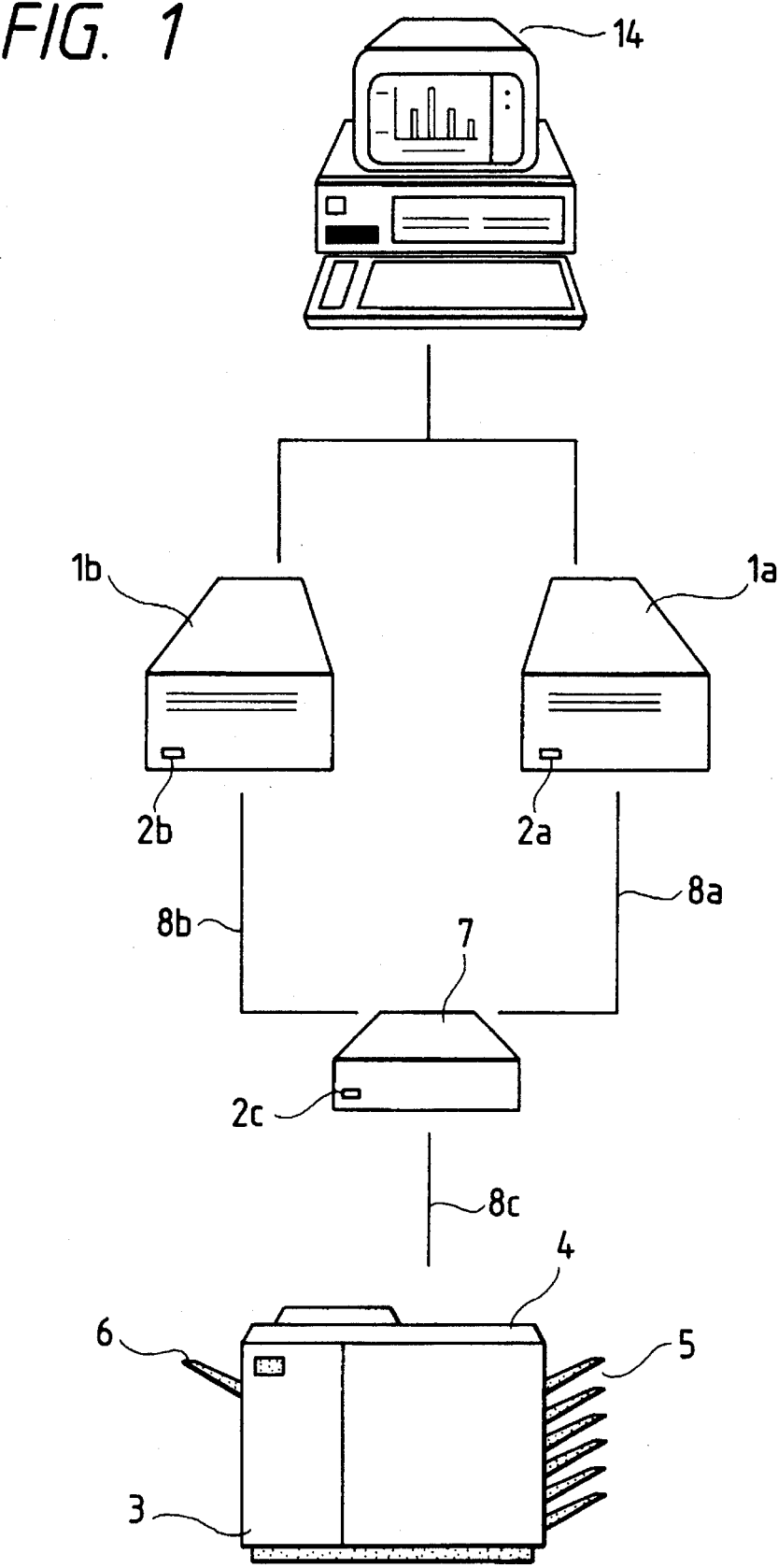
FIG. 1 is a diagram showing the arrangement of a system according to the first embodiment of the present invention.

FIG. 1 is a diagram showing the first embodiment of the present invention. The system shown in FIG. 1 includes memory apparatus main bodies 1a and 1b each having an interpreter function for a page description language (to be abbreviated to as a PDL hereinafter), and a function of holding binary bit map data obtained by developing a PDL command, power switches 2a, 2b, and 2c, a digital color copier main body 3 having a binary printer function, a scanner 4, an Output tray 5, a paper feed cartridge 6, an interface device 7 for connecting between the memory devices 1a and 1b and the copier 3, synthesizing binary image signals (to be referred to as video signals hereinafter) received from the memory devices 1a and 1b, and supplying the synthesized video signal to the copier 3, video interface cables 8a, 8b, and 8c, and a host computer 14 for supplying image information to the memory devices 1a and 1b.

Figure 2:
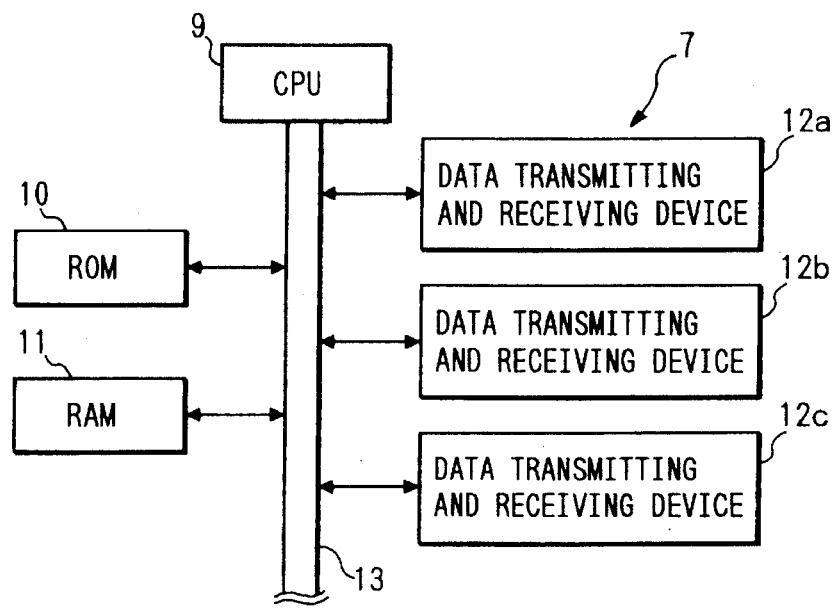
FIG. 2 is a block diagram showing the arrangement of an interface device 7 of the first embodiment.

FIG. 2 is a block diagram of the interface device 7 in FIG. 1. The interface device 7 shown in FIG. 2 includes a CPU 9 for a processing unit, a ROM 10 for storing a processing program for the CPU 9, and the like, a RAM 11 used as a work memory for the system, devices 12a to 12c for transmitting/receiving video signals between the memory devices 1a and 1b, and the copier 3, and a bus 13 for transferring data, addresses, and control signals.

Figure 3:
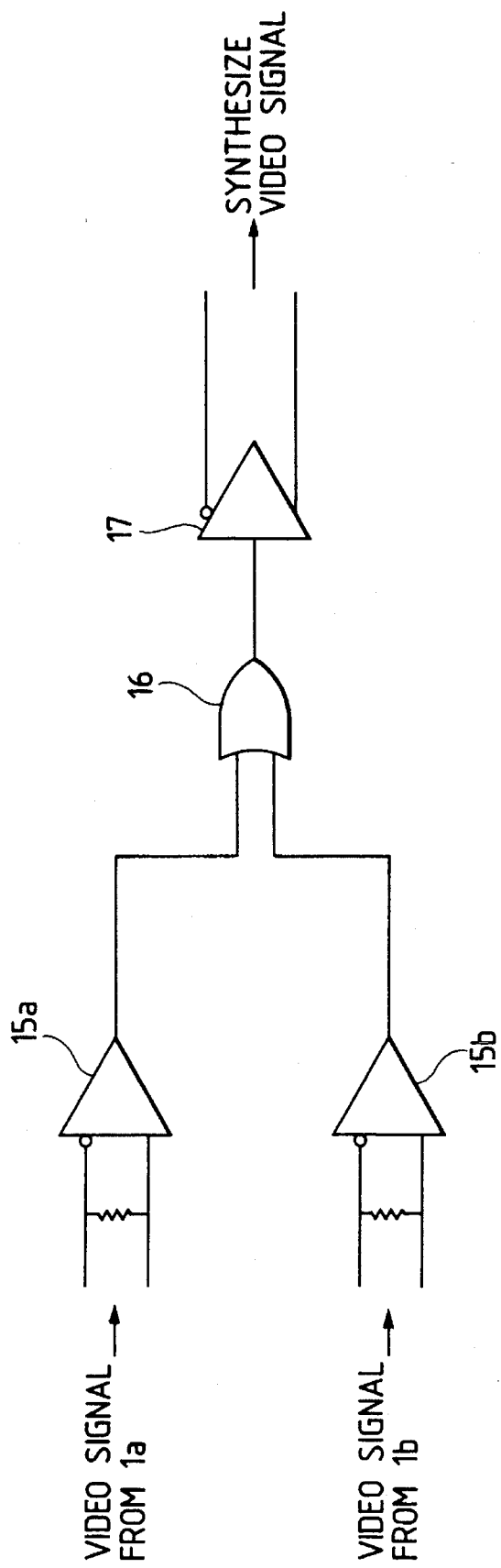
FIG. 3 is a block diagram of a binary-binary, multi value-multi value video signal synthesis section.

FIG. 3 is a block diagram of a section for synthesizing video signals in the interface device 7. This section includes receivers 15a and 15b for receiving video signals, an OR gate 16 for synthesizing the two reception signals, and a driver 17 for transmitting a synthesized video signal to the copier 3.

The operation of this embodiment with the above-mentioned structure will be described below. The host computer 14 transmits halves of PDL commands for one page to the memory devices 1a and 1b, and the memory devices 1a and 1b store independently developed bit map data. The interface device 7 synthesizes the binary bit map data received from the memory devices 1a and 1b, and transmits the synthesized data as a video signal to the copier 3. The copier 3 prints out an image based on the video signal.

Figure 4:
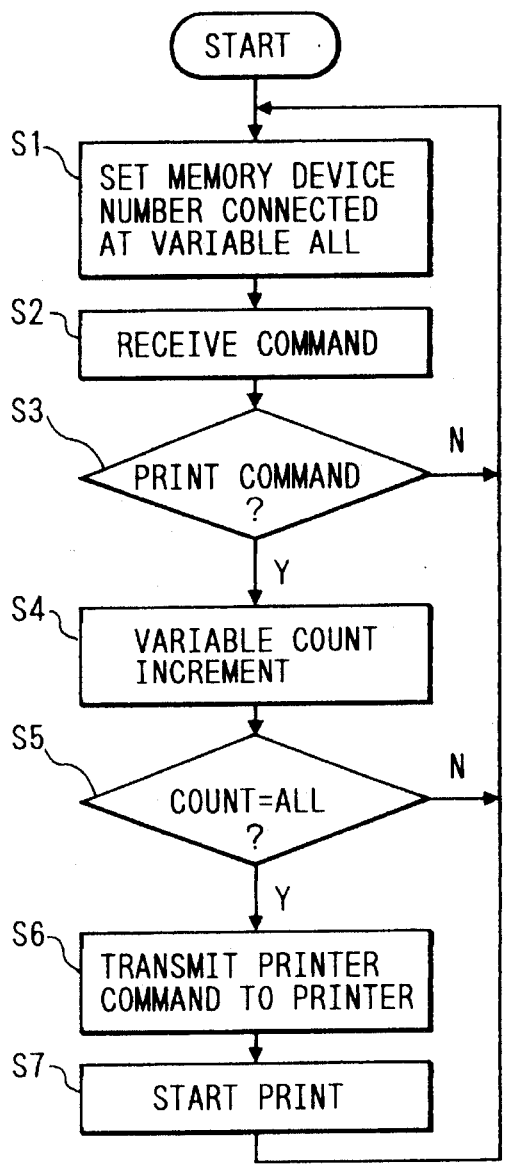
FIG. 4 is a flow chart showing the operation of the interface device 7 of the first embodiment.

The operation of the interface device 7 will be described below. In FIG. 4, in step S1, the number of memory devices connected to the interface device 7 is set in a variable ALL. In step S2, a command from the memory device 1a or 1b is received. In step S3, it is determined if the received command is a print start command. In step S4, a variable "count" is incremented. In step S5, it is determined if the variable "count" coincides with the variable ALL. If Y (YES) in step S5, a print start command is transmitted to the copier 3. At this time, a video signal transmission command is simultaneously supplied to the memory devices 1a and 1b, and video signals are transmitted from the two memory devices to the interface device 7. In step S7, a synthesizing print operation is started.

In the above embodiment, since a single printer engine is connected to the two PDL correspondence memory devices 1a and 1b, PDL commands for one page, which are conventionally processed by a single device, can be distributed to and processed by the two devices, thus increasing the processing speed. This arrangement is particularly effective upon processing of a large amount of bit map data, e.g., upon output of a color image.

In this embodiment, two memory devices are connected. However, three or more memory devices may be connected. The interface device may be incorporated in the copier 3 or the memory devices.

In the above description, the memory devices 1a and 1b, and the copier 3 process binary data. However, they may process multi-value data.

The second embodiment of the present invention will be described below. In this embodiment, image data which includes both text and image data in a single page is to be printed. The basic arrangement of this embodiment is the same as that in the first embodiment, and only the characteristic feature of this embodiment will be described below. A host computer 14 transmits text data in PDL data for one page to a memory device 1a, and image data to a memory device 1b, and the memory devices 1a and 1b respectively store independently developed bit map data. An interface device 7 synthesizes the binary bit map data received from the memory devices 1a and 1b, and transmits the synthesized data as a video signal to a copier 3. The copier 3 prints out an image based on the video signal.

In this embodiment, since image data and text data are respectively distributed to and independently processed by the two memory devices, image data, which requires a long transfer time, can be supplied to the memory device 1b while the text data in PDL data received from the host computer 14 is interpreted and is developed to bit map data, thus increasing the processing speed.

In this embodiment, two memory devices are connected. However, three or more memory devices may be connected to execute distributed processing. The interface device may be incorporated in the copier or the memory devices.

Multi-value data may be processed like in the above embodiment.

Figure 5:
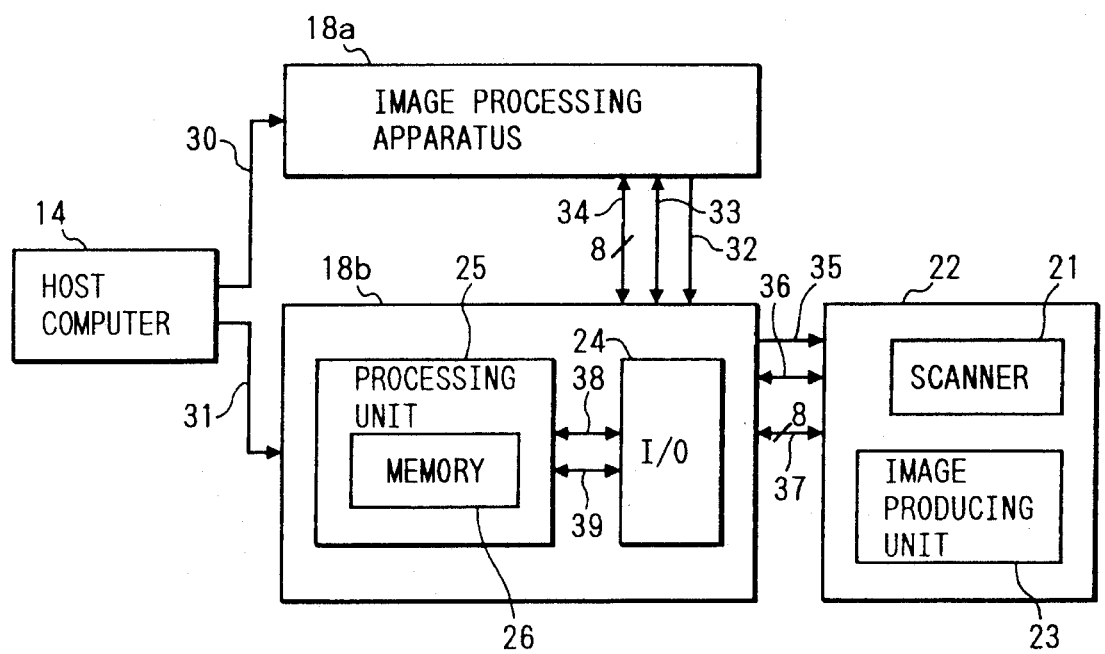
FIG. 5 is a block diagram showing the arrangement of a system according to the third embodiment of the present invention.

FIG. 5 is a block diagram showing the arrangement of the third embodiment of the present invention. A host computer 14 is a host computer having at least two interfaces of, e.g., SCSI, RS-232C, RS-422, Centronics interfaces, and the like. An image processing apparatus 18a is connected to the host computer 14 through, e.g., an SCSI standard interface cable 30. The image processing apparatus 18a has a memory capable of storing Y, M, C, and Bk color multi-value image data for, e.g., one page, and also has a function of executing various image processing operations. Original image data to be stored in the memory in the image processing apparatus 18a may be supplied from the host computer 14 to the memory through the interface cable 30. Alternatively, image data read by a scanner 21 in a copier 22 (to be described later) may be supplied to the memory through lines 37 and 34, and an interface device (I/O) 24. Multi-value image data processed in the image processing apparatus 18a is supplied as 8-bit parallel data to the I/O 24 in a frame-sequential manner in a sequence to be described later.

An image processing apparatus 18b has a processing unit 25 for interpreting and processing a page description language (e.g., Postscript). Data described in the page description language is supplied from the host computer 14 through, e.g., an RS-422 standard interface cable 31. In this embodiment, the processing unit 25 has a memory for storing binary image data for one page in units of Y, M, C, and Bk colors.

The I/O 24 is arranged as an expansion board, which can be mounted in a slot of the image processing apparatus in this embodiment. The I/O 24 outputs binary image data supplied from the processing unit 25 through a line 38 to the copier 22 through a line 35, and also outputs multi-value image data supplied from the image processing apparatus 18a through the line 34 to the copier 22 through the line 37. The copier 22 has an image producing unit 23 having a function of reproducing an image read by the scanner 21, and a function of performing image production on the basis of image data from the lines 35 and 37. When binary image data and multi-value image data are simultaneously input, the copier 22 produces an image by synthesizing the two images.

The I/O of this image processing system has three operation modes, and operations in these operation modes will be described below.

(1) Multi-value Image Data Reproduction Mode

In this mode, an image associated with image data from the image processing apparatus 18a is produced by the copier 22. The connector for the image processing apparatus 18a in the I/O 24 has the same shape as that of the connector of the copier 22, and the lines 32 to 34 extending from the image processing apparatus 18a can be directly connected to the copier 22 in place of the lines 35 to 37. In this mode, the same operation as in such connection is performed. In this mode, the image processing apparatus 18a can output binary image data in addition to multi-value image data. The former data is mainly text data, and the latter data is mainly graphic data. In this mode, image production using a PDL (e.g., Postscript) processed in the processing unit 25 is not performed. In this mode, the I/O 24 supplies status data, sent from the copier 22 through the line 36, to the image processing apparatus 18a through the line 33 without modification, and supplies commands (excluding commands to the I/O), sent from the image processing apparatus 18a through the line 33, to the copier 22 without modification.

(2) Binary Image Data Reproduction Mode

In this mode, the same operation is performed as in a case wherein the I/O 24 is not mounted in the image processing apparatus 18b, i.e., the lines 35 and 36 from the copier are directly connected to the processing unit 25 through the lines 38 and 39. In this mode, the 8-bit parallel line 37 is not used. More specifically, in this mode, only an image associated with binary image data generated using a PDL processed in the processing unit 25 is produced by the copier 22.

(3) Binary/Multi-value Image Data Synthesizing Mode

In this mode, when data for one page includes multi-value image data and PDL compatible binary image data, the host computer 14 stores multi-value image data in the memory in the image processing apparatus 18a, and separately transmits PDL data to the image processing apparatus 18b, so that a memory 26 stores the PDL data as binary image data. The I/O 24 synchronously supplies the multi-value image data and the binary image data to the copier 22. The copier then prints out a synthesized image.

Figure 6:
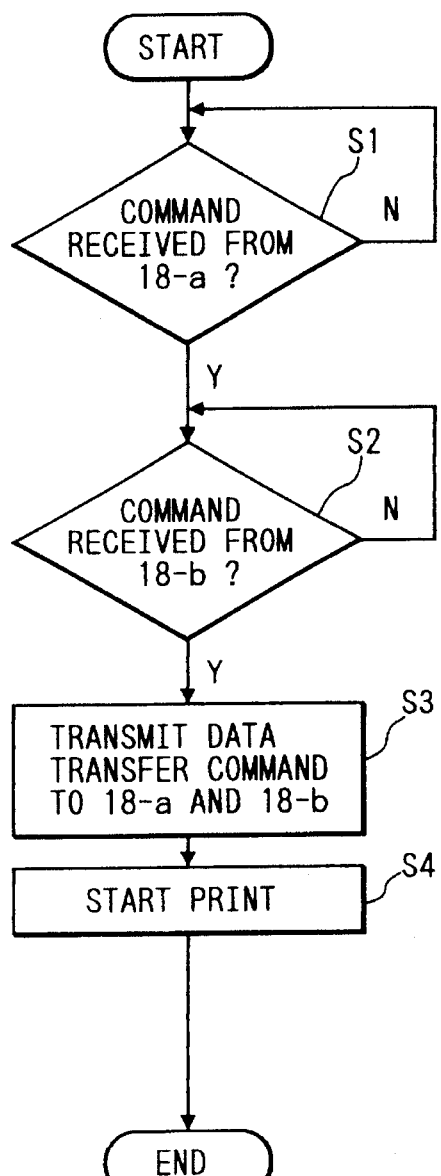
FIG. 6 is a flow chart showing the operation of an interface device 24 of the third embodiment.

The operation of the I/O 24 in this mode will be described below. In step S1 in FIG. 6, a reception standby state of a data transfer preparation completion command from the image processing apparatus 18a is set. In step S2, a reception standby state of a data transfer preparation completion command from the image processing apparatus 18b is set. In step S3, a data transfer command is transmitted to the two image processing apparatuses 18a and 18b. In step S4, the two types of image data are supplied to the copier 22, and the print operation is started.

In general, a versatile PDL can process binary image data but cannot process multi-value image data to eliminate recording apparatus dependency, and hence, even when a recording apparatus can record multi-value image data, a high-quality image cannot be produced based on multi-value image data when a PDL which cannot process the multi-value image data is used. In this embodiment, since the two image processing apparatuses, i.e., the multi-value compatible image processing apparatus and the PDL compatible image processing apparatus, are connected to a single recording apparatus, even when a PDL which can process only binary image data is used, a high-quality image based on multi-value image data can be reproduced.

Since multi-value image data, which requires a larger memory capacity than binary image data, can be processed by another image processing apparatus different from that for binary image data, the load on the binary image data compatible image processing apparatus can be reduced, resulting in high efficiency.

In this embodiment, two image processing apparatuses are connected to a single copier. However, three or more image processing apparatuses may be connected. The I/O may be independently arranged or may be incorporated in the copier.

Furthermore, a case has been described wherein a copier having a scanner is used. However, a laser printer, an ink-jet printer, a dot printer, and the like may be used as long as they have an image production function.

As described above, according to this embodiment, since a plurality of means for generating image signals to be supplied are connected to a single printer engine, and a system has a function of synthesizing image signals from the different image signal generation means, and printing out the synthesized image, the following effects can be expected.

(1) Since the plurality of image signal generation means are connected to the single printer engine, one image signal generation means can be connected to the printer engine, while another image signal generation means can execute post-print processing such as development of bit map data, thus increasing the processing speed as a whole.

(2) Since a binary image signal and a multi-value image signal from the binary or multi-value compatible image signal generation means can be arbitrarily combined and printed out, various processing operations such as binary/multi-value synthesizing processing can be easily realized.

(3) The single printer engine can economically realize an efficient environment.

The fourth embodiment of the present invention will be described in detail below with reference to the accompanying drawings.

Figure 7:
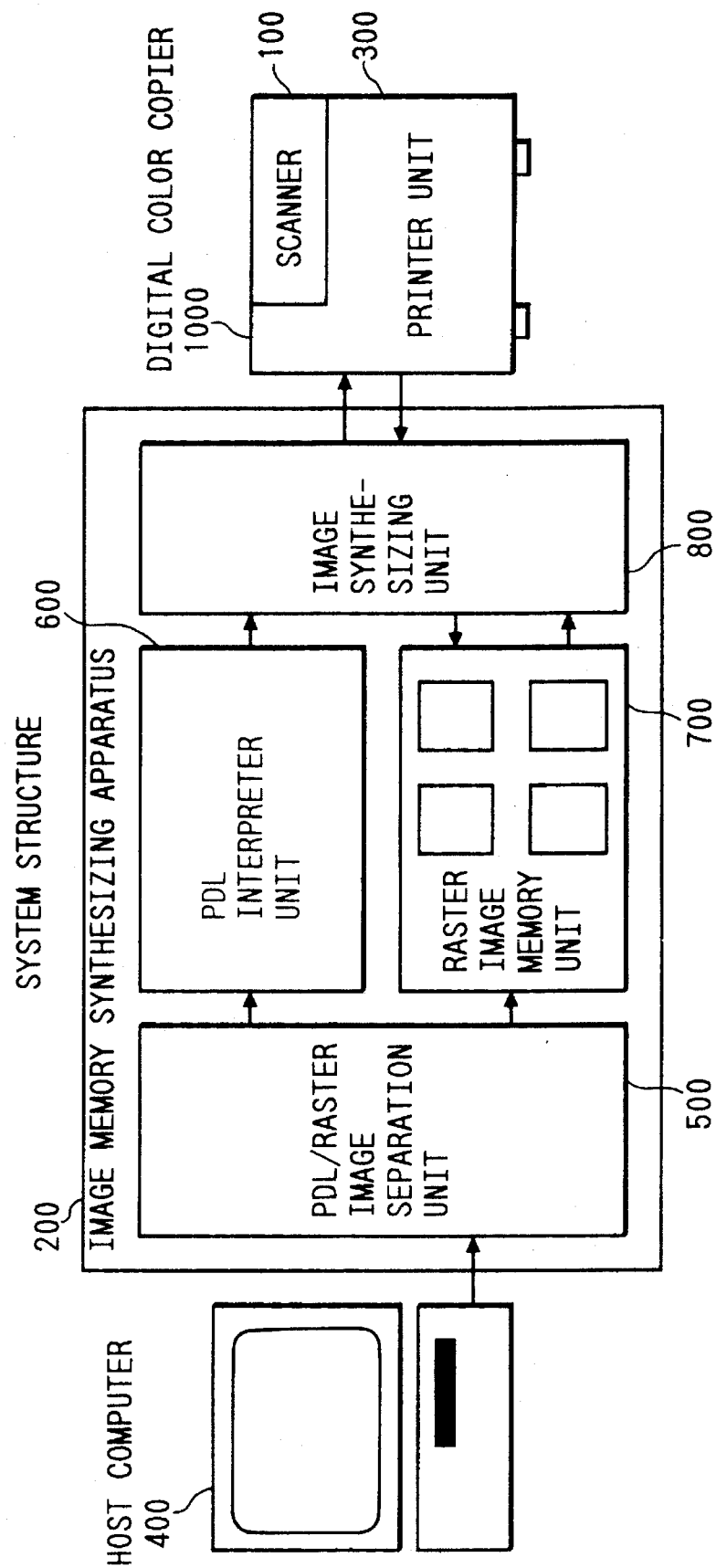
FIG. 7 is a diagram of the arrangement of a system according to the fourth embodiment of the present invention.

FIG. 7 is a diagram showing the arrangement of a color image producing/output system according to the fourth embodiment of the present invention. As shown in FIG. 7, the system of this embodiment is constituted by a digital color copier 1000 which has a digital color image scanner (to be referred to as a "color scanner" hereinafter) 100 on its upper portion, and a digital color image print unit (to be referred to as a color printer hereinafter) 300, an image memory synthesizing device 200, and a control computer

400.

Figure 8:
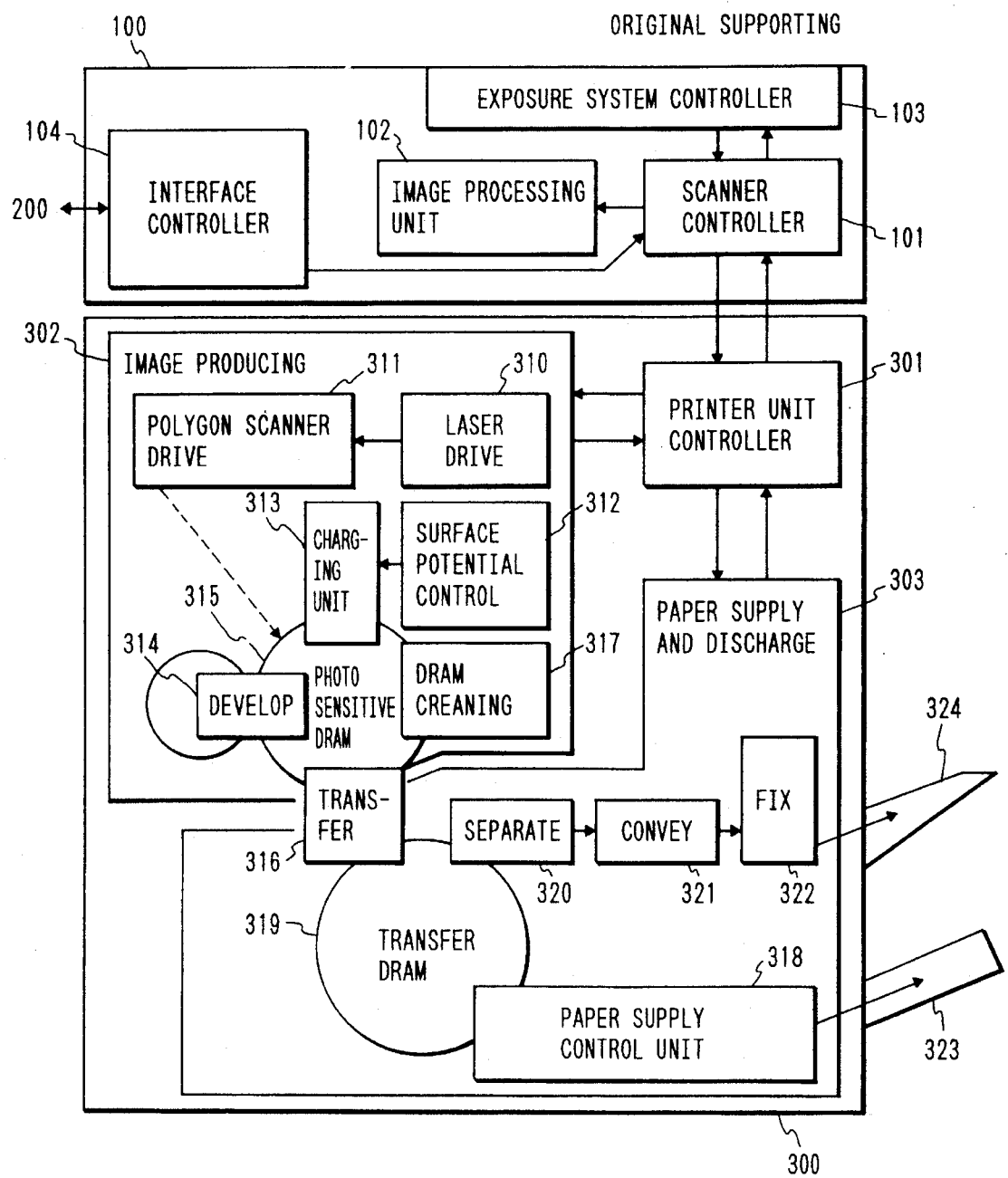
FIG. 8 is a diagram of a digital color copier of the fourth embodiment.

FIG. 8 shows the arrangement of this digital color copier.

In a scanner 100 portion, a scanner controller 101 serves as a main controller, and performs the following control.

An exposure system controller 103 causes contact type CCD line sensors to color-separate an original placed on an original table in units of R, G, and B colors, and to convert the color-separated signals into dot-sequential analog image signals. The analog image signals are converted into 8-bit digital image signals in units of colors by an A/D converter. Thus, the R, G, and B color signals as brightness signals are output as line-sequential signals. The image signals (digital signals) are converted from R, G, and B brightness levels to levels corresponding to toner amounts of four colors, i.e., C, M, Y, and Bk as density levels by an image processing unit 102. At the same time, the converted signals are subjected to arithmetic operations in a color correction section in the image processing unit, and various image processing operations such as synthesizing processing, variable-magnification processing, move processing, and the like are performed.

In a printer 300 portion, the C, M, Y, and Bk digital image signals sent from the scanner 100 portion are converted into ON signals for a semiconductor laser unit. A laser is controlled by a laser drive unit 310, and the laser ON signals are output as pulse widths corresponding to the levels of the digital image signals. The laser ON levels include 256 levels (corresponding to 8 bits). The printer is a laser beam printer adopting an electrophotography system. That is, color images are sequentially exposed in a digital dot form on a photosensitive drum 315 in units of C, M, Y, and Bk colors according to the digital image signals to be output, and are developed by a develop unit 314. The respective color images are transferred onto a paper sheet by a transfer unit 316 a plurality of number of times, and finally, the transferred images are fixed by a fix unit 322.

The color scanner 100 portion and the color printer 300 portion can also serve as the digital color copier 1000 by controlling the color printer 300 under the control of the color scanner 100 portion.

An original image is set on the original table of the color scanner 100 portion, and a copy start key is depressed. Thus, an image is scanned by the color scanner portion according to the above-mentioned process, and color images are produced via exposure, develop, transfer, and fix processes in the color printer 300 portion, thereby outputting a full-color image.

Figure 9:
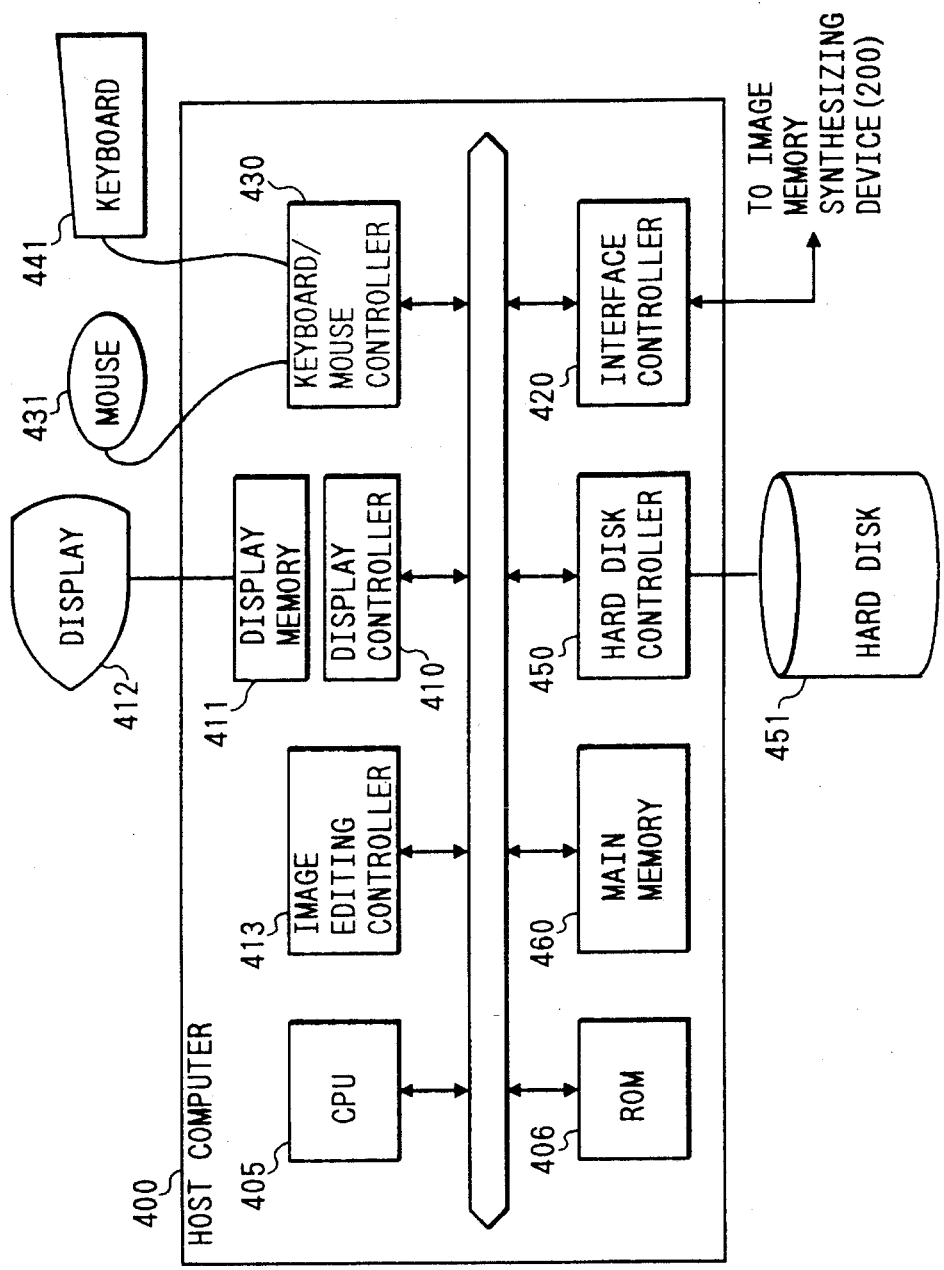
FIG. 9 is a block diagram of a control host computer of the fourth embodiment.

FIG. 9 shows the arrangement of the control host computer 400.

The host computer 400 comprises an interface (I/F) controller 420 for exchanging codes/command of PDL data with the image memory synthesizing device 200, a RISC CPU 405, serving as a central control CPU, for processing, e.g., RISC data, a hard disk controller 450, a hard disk 451, and a main memory 460, which are used for temporarily registering image data, and for storing various data, a mouse 431 and a keyboard 441, which serve as instruction input means from an operator, a color display 412, a display memory 411, and a display controller 410, which are used for layout and editing operations, and a menu display, and an image editing controller 413 for performing image layout and editing operations on the display memory 411.

Figure 10:
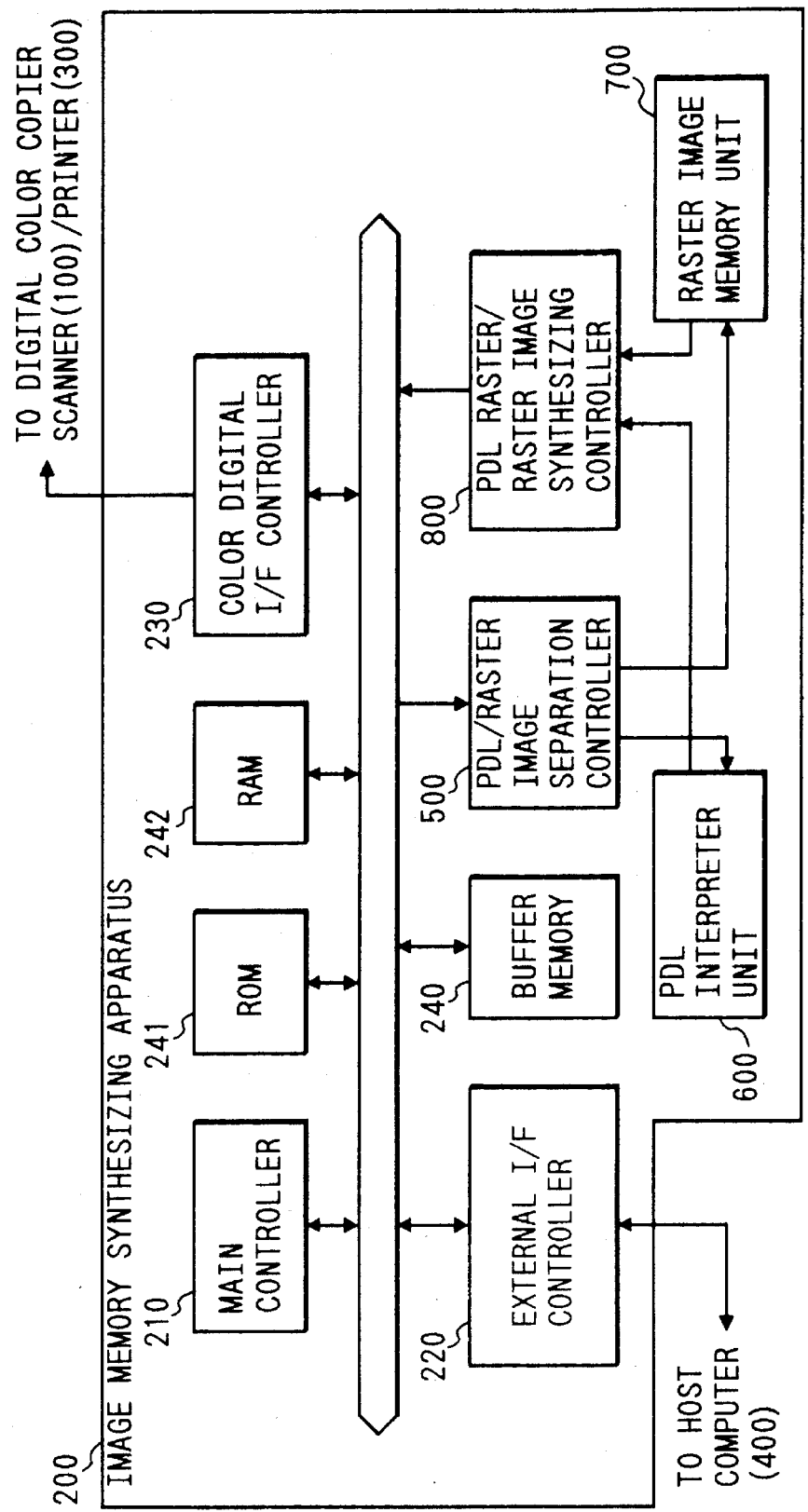
FIG. 10 is a block diagram of an image memory synthesizing device of the fourth embodiment.

FIG. 10 shows the image memory synthesizing device 200 shown in FIG. 7.

This device is roughly classified into a main controller 210 for controlling the entire image memory synthesizing device 200, a PDL/raster image separation controller 500 for interpreting the content of PDL (Page Description Language) data, and separating command data (data other than a raster image) in the PDL data, and raster image data, a PDL interpreter unit 600 for performing interpretation and image development of the separated command data in the PDL data, the image input scanner 100 for inputting an image, a raster image memory unit 700 for storing/maintaining and laying out the separated color multi-value raster image data and its position/category information, and color multi-value raster image data and its Position/category information from the image input scanner 100, and a PDL raster/raster image synthesizing controller 800 for synthesizing a PDL raster image image-developed on the basis of the separated data, and another multi-value image data according to an image generated on the computer 400.

Furthermore, the device also includes, as interfaces, an external interface (I/F) controller 220 for exchanging PDL commands/codes with the control host computer 400, and a color digital interface (I/F) controller 230 for exchanging image data and commands with the digital color copier 1000.

Figure 11:
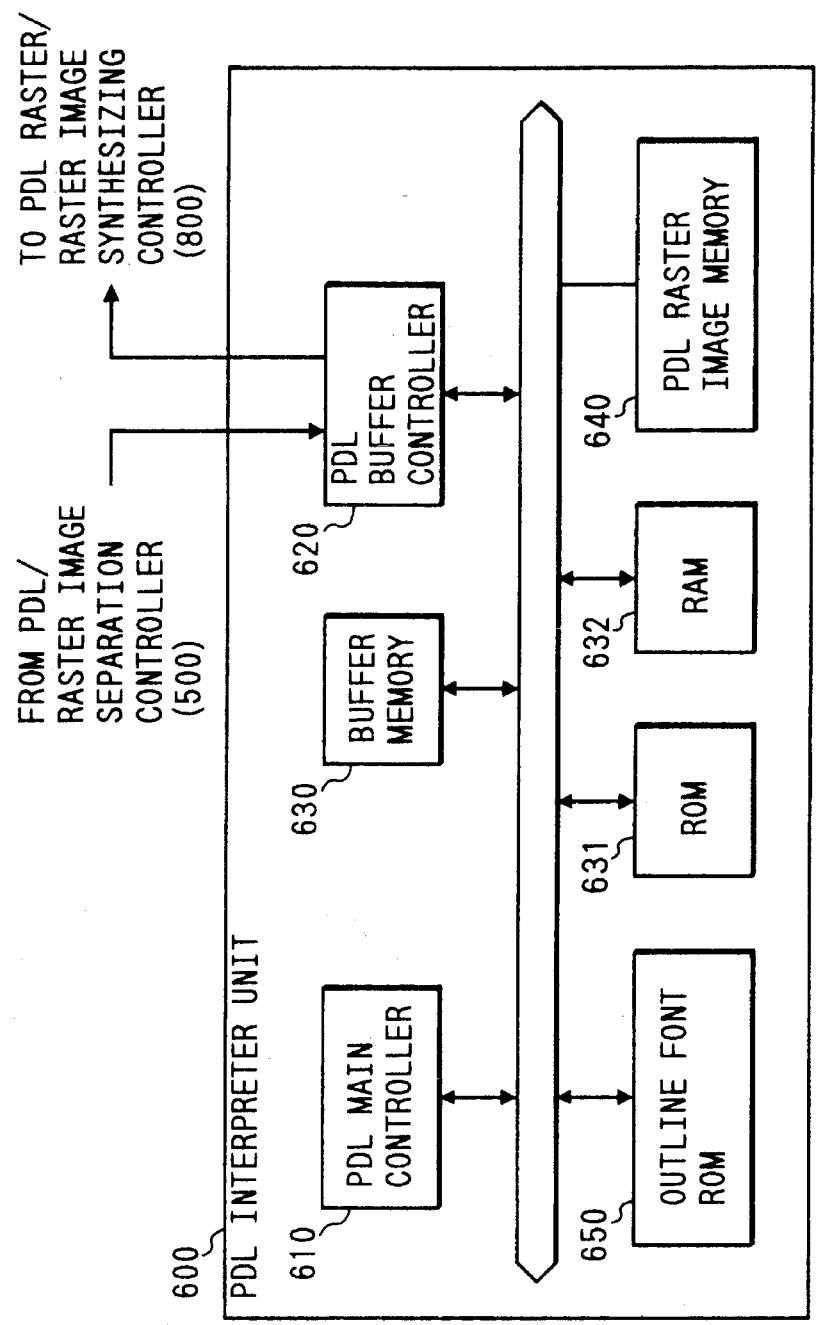
FIG. 11 is a block diagram of a PDL interpreter unit of the fourth embodiment.

FIG. 11 is a block diagram of the PDL interpreter unit 600.

A PDL main controller 610 receives a PDL vector (non-raster image data) system command sent from the PDL/raster image separation controller 500, and temporarily registers the received command in a buffer memory 630. The PDL main controller 610 image-develops the PDL command in a PDL raster image memory 640 on the basis of interpretation information from a ROM 631. Upon image development, if a character is designated by the PDL command, the PDL main controller reads out outline font data from a ROM 650 for storing the outline font data, temporarily registers a font image in a designated size, and fits the image at the designated position in the PDL raster image memory. In this embodiment, when a font of the same code is repetitively designated, a font image already registered in a ROM 632 is utilized to shorten the development time. Finally, image information designated by the PDL command is developed in the PDL raster image memory 640.

Note that the PDL raster image memory 640 may store either binary or multi-value data.

Figure 12:
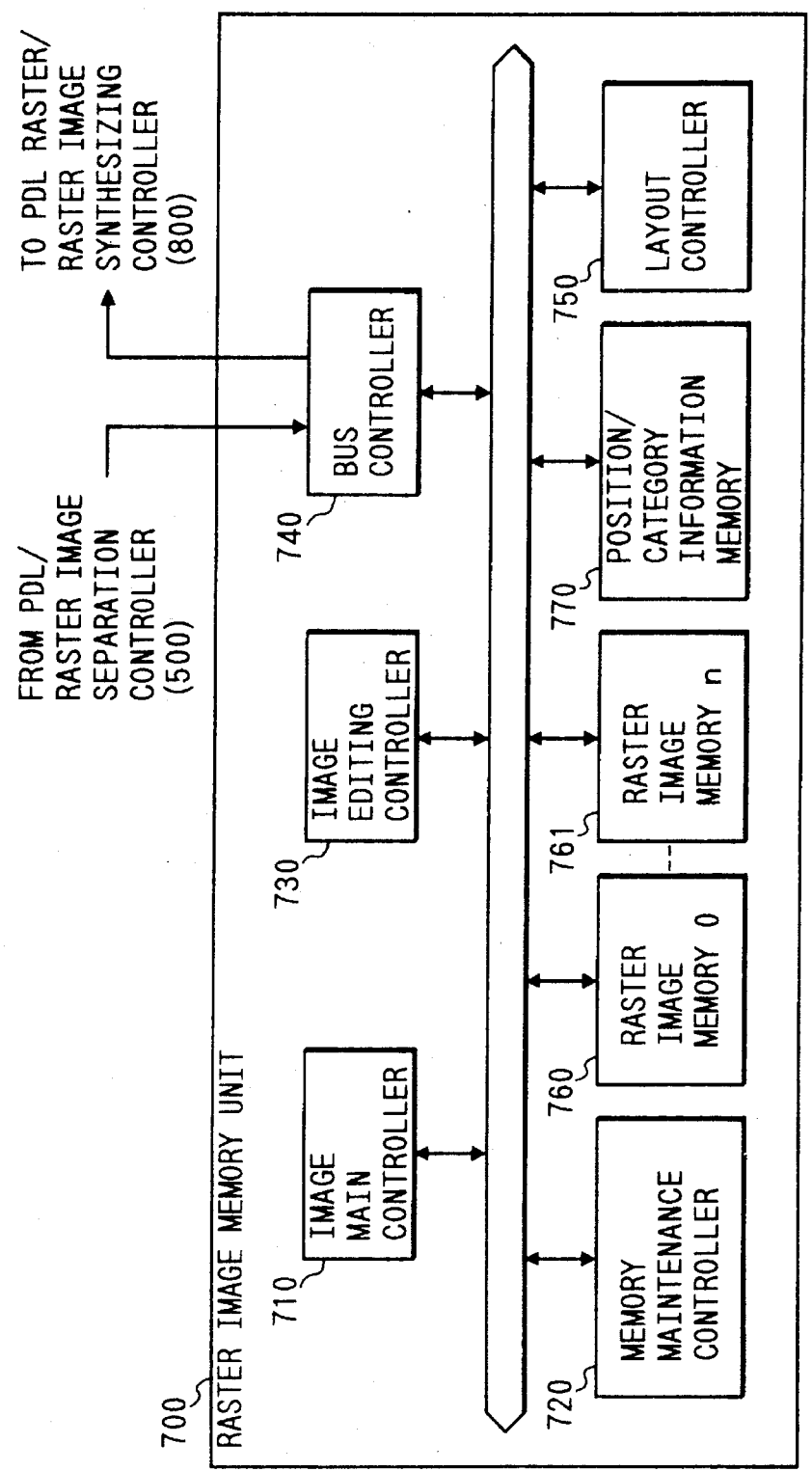
FIG. 12 is a block diagram of a raster image memory unit of the fourth embodiment.

FIG. 12 is a block diagram of the raster image memory unit 700 shown in FIG. 7.

The raster image memory unit 700 can store a plurality of color images. The read timings of the stored image data are controlled in units of memories according to a command from the control computer 400 so as to perform a plurality of layout operations. The image data are synthesized., and the synthesized image data is output to the color printer 300, thus obtaining a color print image.

At this time, the input source of color image data can be arbitrarily switched between the control computer 400 and the color scanner 100 according to a command from the control computer 400.

Image data and commands of thee control computer 400 and the image memory synthesizing device 200 are based on a specific format.

The raster image memory unit 700 is mainly constituted by an image main controller 710 for controlling color raster image data, a memory maintenance controller 720 for efficiently arranging color raster image data to a plurality of registration raster image memories 760, . . . , 761, and maintaining the color raster image data, an image editing controller 730 for performing image conversion associated with colors of the registered image data, and a layout controller 750 for performing a layout/editing operation.

In addition, a bus controller 740 is used for controlling a main bus between the raster image memory unit 700 and the image memory synthesizing device 200 is arranged. Furthermore, the layout controller 750 can perform a plurality of layout operations within one page, and can cooperate with the bus controller 740 according to an instruction from the image main controller 710 so as to supply a plurality of layout images to the PDL raster/raster image synthesizing controller 800 shown in FIG. 10.

Figure 13:
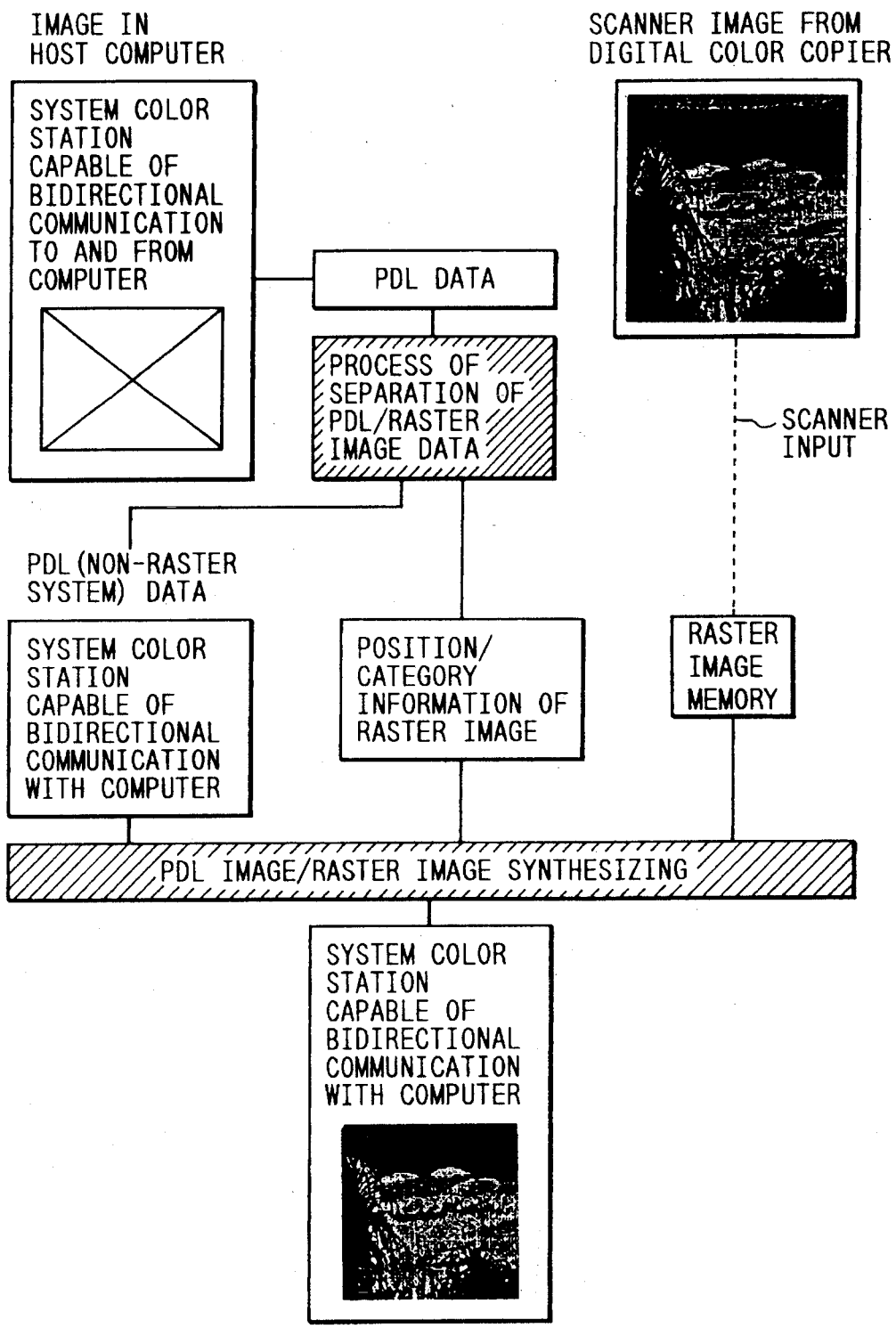
FIG. 13 is a flow chart showing processing for synthesizing PDL data with a separated raster image.

The operation sequence of the color image producing/output system with the above arrangement will be described below with reference to FIG. 13.

(a) Processing on Host Computer

On the computer 400 shown in FIG. 7, a DTP (desk top publishing) software program is loaded from the hard disk 451 shown in FIG. 9 to the main memory 460, and is executed by the CPU 405. A user lays out a document and various image data (e.g., an illustration produced based on vector data/a natural image scanned by, e.g., a scanner, and the like) using the mouse 431 and the keyboard 441. Note that this layout operation is directly performed while confirming an image on the display 412. During this operation, process sequence/image data, and the like of a generated arbitrary document image are properly registered on the main memory 460 by the image editing controller 413. When the layout operation for one page is completed, the image editing controller 413 controls the hard disk controller 450 to register layout data for one page on the hard disk 451.

During this interval, when the document image developed on the display memory 411 with the above operation is displayed on the display 412, and is completed, various kinds of information associated of the layout document image on the hard disk are converted into PDL (Page Description Language) codes for defining a document and an image generated by the layout operation by a device driver software program in the ROM under the control of the CPU 405.

The converted PDL codes include vector system information such as characters, illustrations, and the like, and raster image data such as a layout natural image, and the like.

The computer 400 causes the I/F controller 420 to communicate with the external I/F controller 220 in the image memory synthesizing device 200 shown in FIG. 10, thereby transferring the PDL codes to the image memory synthesizing device 200.

(b) Separation of PDL Data

In the image memory synthesizing device 200, the transferred PDL codes are properly stored in a buffer memory 240. When the storage amount reaches a predetermined size, the main controller 210 instructs the PDL/raster image separation controller 500 to separate/interpret the PDL codes stored in the buffer memory.

The PDL/raster image separation controller 500 checks the content of the PDL codes line by line. When it is determined that the content of the PDL codes does not represent a command associated with raster image data (i.e., represents vector system data), the controller 500 supplies the PDL data to the PDL interpreter unit 600 without modifications. On the other hand, when it is determined that the content of the PDL codes represents a command associated with raster image data, the controller 500 interprets raster image data information such as the layout position of the image, the image size, the number of bits per pixel, and the transfer order of raster data on the basis of the PDL codes, and transfers the information to the raster image memory unit 700. Furthermore, the controller 500 reads a raster image data body sent after the raster system PDL codes, and transfers only the raster image data to the raster image memory unit 700 after the previously sent information such as the image size, position, and the like.

The separated PDL raster system commands, parameters, and the raster image body are only supplied to the raster image memory unit 700 by the PDL raster image separation controller 500, and are not supplied to the PDL interpreter unit. Thus, the PDL interpreter unit 600 performs PDL image development based on an image excluding a raster image. At this time, in this embodiment, the PDL interpreter unit performs image development as binary data.

(c) Processing of PDL (Non-raster Image System) Data

The PDL main controller 610 receives the PDL vector (non-raster image data) system command, and temporarily registers the command in the buffer memory 630 shown in FIG. 11. The PDL main controller 610 performs image development of the received PDL command in the PDL raster image memory 640 on the basis of the interpretation information from the ROM 631. Upon image development, when the PDL command designates a character, the controller 610 reads out font data of outline information from the outline font ROM 650, develops the font data to a font image in a designated size, temporarily registers the developed font image, and fits the image at the designated position in the PDL raster image memory. As described above, when a font of the same code is repetitively designated, a font image already registered in the RAM 632 is utilized to shorten the development time.

Finally, vector image information designated by the PDL codes, which is the same as the image generated on the computer 400, is developed as a binary image in the PDL raster image memory 640 in correspondence with the resolution of the printer 300.

(d) Processing of Raster Image Data

The image main controller 710 of the raster image memory unit 700 shown in FIG. 12 assigns an arbitrary image ID for identifying a raster image to raster image data on the basis of the image file name, layout designated position information, and category information of the raster image data sent from the PDL/raster image separation controller 500 through the bus controller 740 in accordance with an instruction from the main controller 210 in the image memory synthesizing device 200. The controller 710 then transfers the information to the memory maintenance controller 720. The memory maintenance controller 720 efficiently stores the raster image data body, its image ID, image size, and category sent from the PDL/raster image separation controller 500 in the raster image memory 760. In this case, the controller 720 links the storage position, the category information such as the size, and the assigned image ID of the raster image, and stores the linked information in a position/category information memory 770 together with layout position information/image category information. This information is utilized when a print-out operation is actually performed. These processing operations can be performed for a plurality of images, and a plurality of raster image data can be stored in the raster image memory 760.

In this manner, the raster image data separated from the

PDL data, which are laid out in one page, are registered in the raster image memory unit 700 as multi-value color images.

(d') Input of Raster Image

A case will be explained below wherein a raster image laid out in the host computer 400 is replaced with another image or an image having a higher resolution. In this case, an original image to be replaced is placed on the scanner 100 of the digital color copier 1000.

The host computer 400 shown in FIG. 9 instructs the main controller 210 in the image memory synthesizing device 200 to read the maximum readable area from the scanner 100 of the digital color copier 1000. In this case, a low resolution is set in correspondence with the resolution of the display memory 411. The read image is fetched as a pre-scan image from the image memory synthesizing device 200 to the display memory through the I/F controller 420. The CPU 405 displays the pre-scan image on the display 412.

Furthermore, an area to be actually scanned, a resolution, and an image ID upon registration in the raster image memory unit 700 in the image memory synthesizing device are designated using the mouse 431 or the keyboard 441.

The CPU 405 transfers the above information to the main controller 210 of the image memory synthesizing device 200 through the I/F controller 220, thus issuing an image fetch instruction. This instruction is transmitted to the scanner 100 shown in FIG. 7 through the I/F controller 230. Thus, the scanner 100 of the color digital copier fetches image data in the designated area at the designated resolution, and the read image data is registered in the raster image memory unit 700 with the designated ID. As described above, the storage position and category information such as a size of the raster image are stored together with the image data.

On the basis of the position information and category information in the position/category information memory 770 used upon output of raster images separated from the PDL codes, the host computer causes the display to display a list of information such as the image file name, the image size, and the layout position of the layout raster image data. From the list of information, data to be replaced with another image data read from the scanner or high-resolution data upon output is selected.

A list of image data registered in the raster image memory unit 700 is then displayed, and an image to be output is selected using the mouse or the keyboard. In this process, the selected image ID in the position/category information memory 770 is replaced with the selected new image ID.

(e) Synthesizing of PDL Image and Raster Image

Upon completion of the image development for one page in the PDL interpreter unit 600, and the replacement and registration of the raster images in the raster image memory unit 700, the host computer 400 issues an instruction, and the main controller 210 (FIG. 10), which received this instruction through the I/F controller 220, requests the PDL raster/raster image synthesizing controller 800 (FIG. 10) to transfer image-developed image data from the corresponding bus controllers 620 and 720.

An image from the PDL interpreter unit 600 is processed as data for one page, and the data is transferred line by line. In the raster image memory unit 700, the layout controller 750 (FIG. 12) in the raster image memory unit 700 enlarges/reduces the registered raster image data to the designated size in a layout image using the image editing controller 730 according to a timing for each line from the PDL raster/raster image synthesizing controller 800 on the basis of the content of the position/category information memory 770, which is replaced with a scanner image, as described above.

The raster image data is transferred to the PDL raster/raster image synthesizing controller 800 through the bus controller 740 (FIG. 12).

The PDL raster/raster image synthesizing controller 800 synthesizes the two raster images, and the main controller 210 of the image memory synthesizing device 200 shown in FIG. 10 transfers a print operation start command and synthesized image data to the digital color copier 1000 through the color digital I/F controller 230.

At this time, ON/OFF bits of the binary image such as a character, illustration, or the like developed the PDL interpreter unit 600 are converted into maximum/minimum density data of multi-value image data, and the converted data are synthesized with color multi-value data in the raster image memory unit.

(f) Printer Output by Digital Color Copier

The digital color copier 1000 receives the print operation start command from the main controller 210 of the image memory synthesizing device 200 through the color digital I/F controllers 230 and an I/F controller 104 shown in FIG. 8, and executes the above-mentioned copy process according to the received command, thereby obtaining an image output obtained by synthesizing the binary image such as a character, an illustration, or the like based on the PDL codes, and a multi-value color rater image.

In this embodiment, an image control command from the computer 400 may be applied not only to programmable codes such as PDL codes, but also to a control code system of character codes.

Character code data supplied from the computer 400 is temporarily stored on the buffer memory 240 in the image memory synthesizing device 200 shown in FIG. 10 through the external I/F controller 420. A controller, corresponding to the above-mentioned PDL/raster image separation controller 500, for separating character system control codes and raster image data checks in the order of the stored character data if the character data is a control system code or merely a character code. If a control system code is detected, it is supplied to the interpreter unit 600 for performing image development corresponding to the control system code, and an image development operation based on processing of the control system code on the ROM 631 shown in FIG. 11 is performed.

In the case of an image control code, the data size/position information of an image is designated, and thereafter, actual image data is sent as image data. These data are supplied to the raster image memory unit 700, and the above-mentioned various processing operations can be performed.

Figure 14:
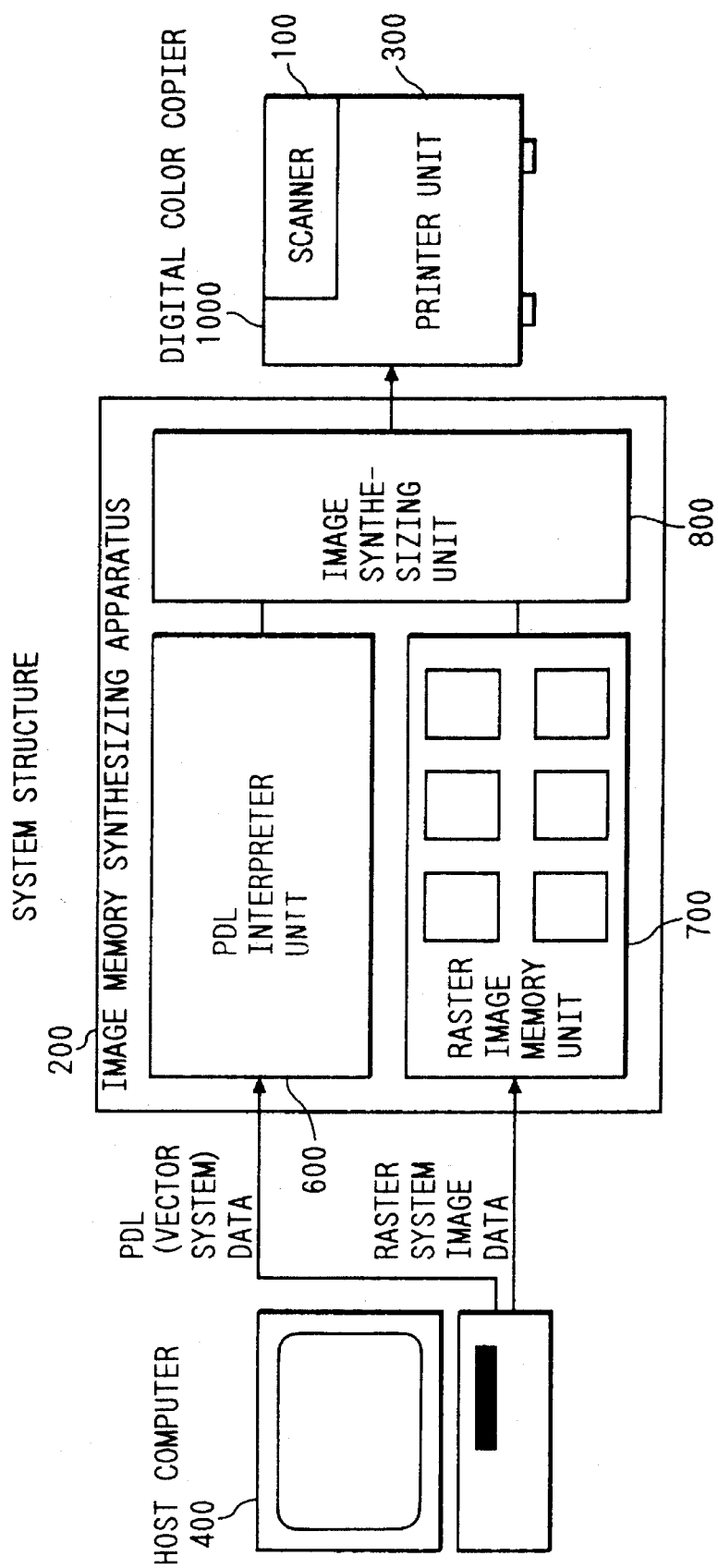
FIG. 14 is a diagram showing the arrangement of a system according to the fifth embodiment of the present invention.
Figure 15:
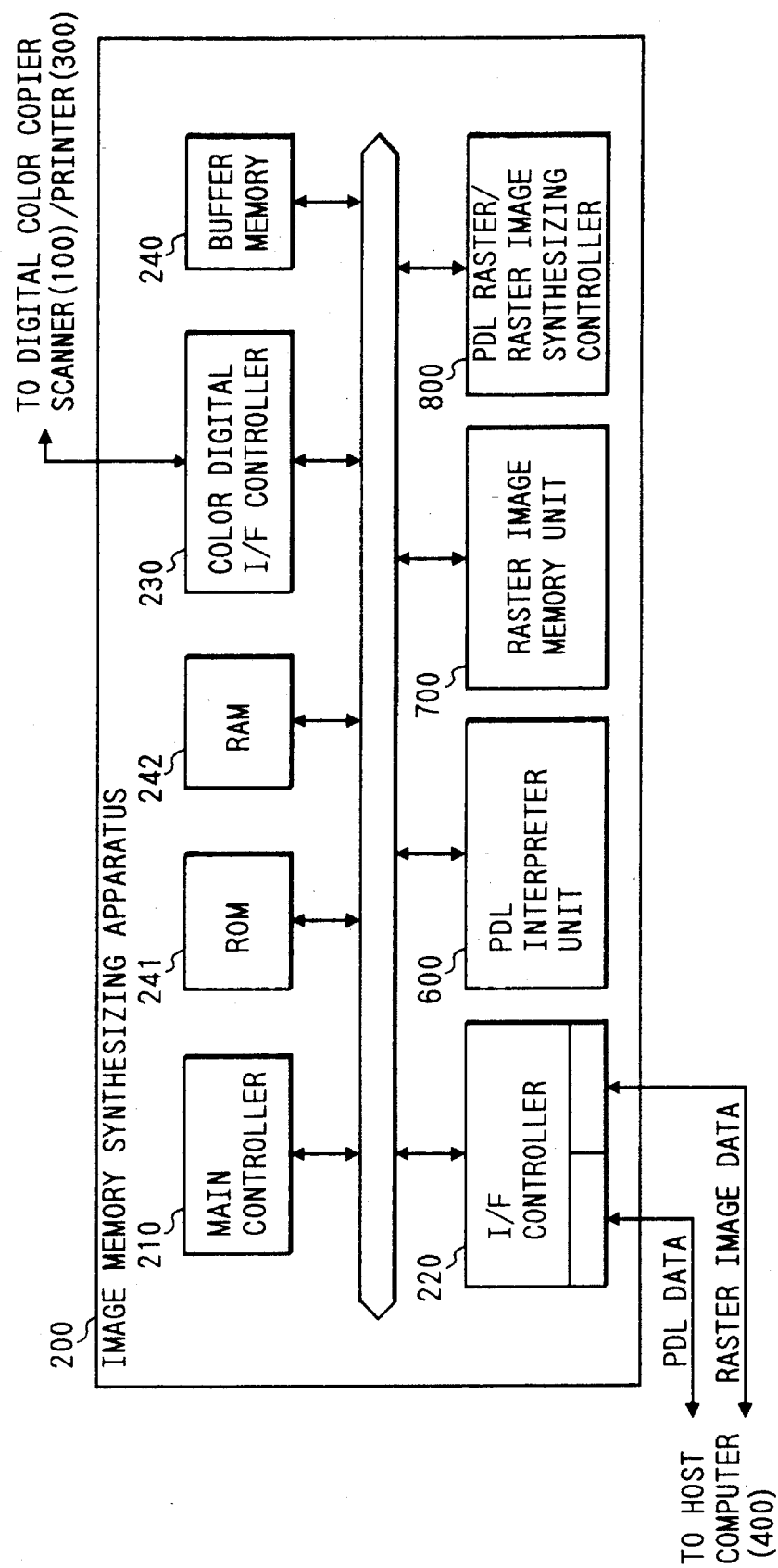
FIG. 15 is a block diagram of an image memory synthesizing device of the fifth embodiment.

FIGS. 14 and 15 respectively show the arrangement of a color image producing/output system according to the fifth embodiment of the present invention, and functional blocks of an image memory synthesizing device 200.

A difference from the fourth embodiment will be described below.

In this embodiment, vector system/raster system separation of PDL codes, which is performed in the image memory synthesizing device 200 in the embodiment shown in FIG. 7, is performed in a host computer 400, thereby simplifying the arrangement of the image memory synthesizing device.

For this reason, in the fifth embodiment, an I/F controller 420 has two different interfaces, e.g., GP-IB and Apple Talk interfaces.

In this embodiment, a user lays out a document and various image data (an illustration produced based on vector data, a natural image scanned by a scanner, and the like) using a mouse 431 and a keyboard 441 on the computer 400 like in the fourth embodiment. This layout operation is directly performed while confirming an image on a display 412. During this interval, process sequence/image data, and the like of a generated arbitrary document image are properly registered on a main memory 460 by an image editing controller 413. When the layout operation for one page is prepared, layout data for one page are registered on a hard disk 451 by controlling a hard disk controller 450.

Figure 16:
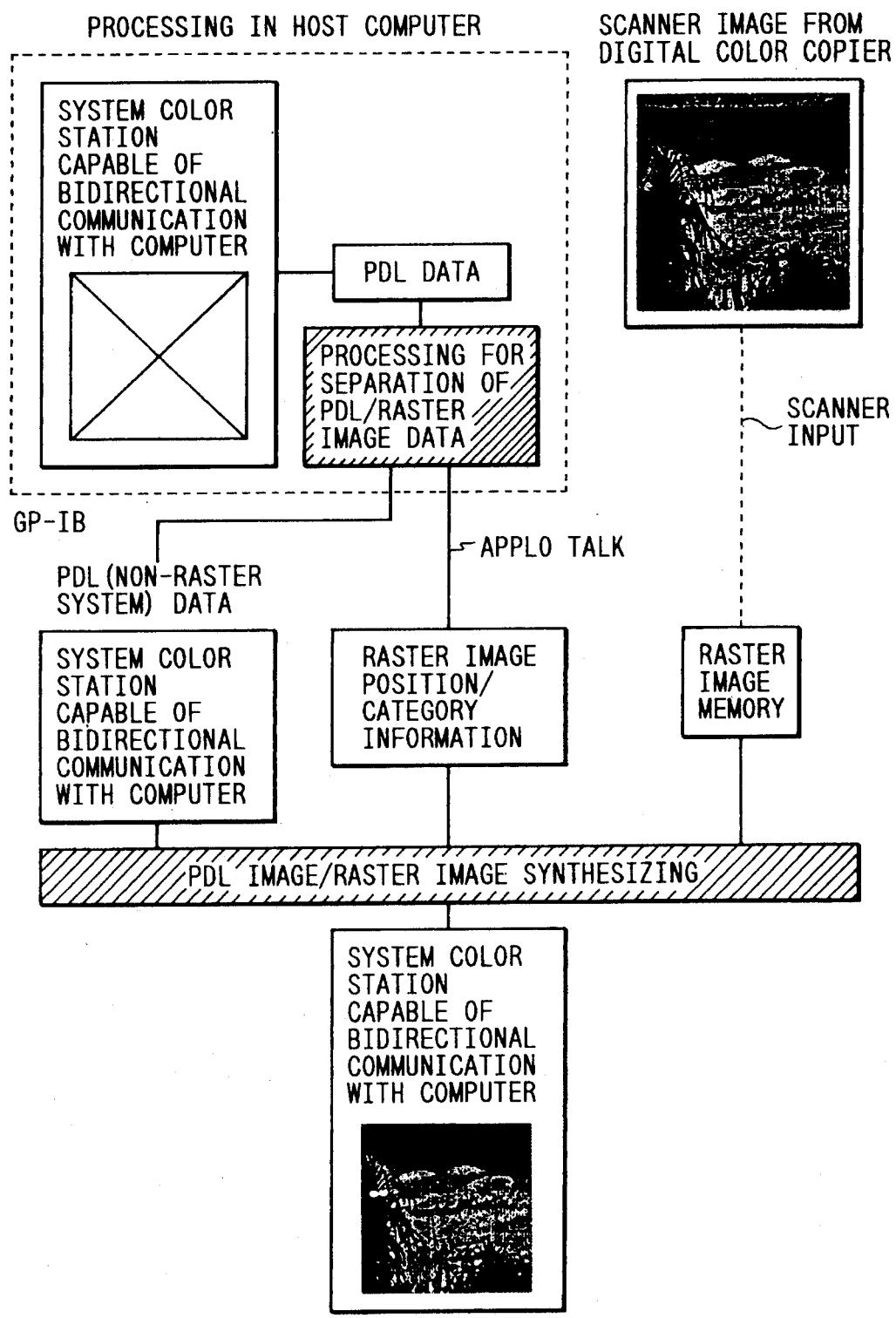
FIG. 16 is a flow chart showing another example of the processing shown in FIG. 13.

When the layout operations are finally completed, various kinds of information of a document layout image stored on the hard disk 451 are converted into PDL (Page Description Language) codes for defining a document generated by the layout operation by a device driver software program in a ROM in a sequence shown in FIG. 16. In this case, color multi-value image data such as a natural image is not described in PDL codes, but is registered as another data in the hard disk together with its image file name, layout position, image size, and category information.

The converted PDL codes for one page are supplied to a PDL interpreter unit 600 in the image memory synthesizing device 200 through the Apple Talk interface of the I/F controller 420 as vector system information such as characters or illustrations. As in the fourth embodiment, a PDL image for one page is developed as a binary image on a PDL raster image memory 640 in the PDL interpreter unit.

As in the fourth embodiment, a scanner 100 of a digital color copier is controlled by the host computer 400 to scan an original to be laid out at a high resolution, and the scanned image is registered in a raster image memory unit 700 in the image memory synthesizing device 200. This operation is repeated in correspondence with the number of required images.

As has already been described in the fourth embodiment, all the layout positions, image file names, image sizes, and category information stored in the hard disk are read out, and are displayed as a list on a display. From this list, image data to be replaced with an image input from the scanner is selected, and an image to be used is selected from the list of images already registered in the raster image memory unit 700. Thus, a low-resolution image laid out on the host computer can be replaced with a high-resolution image scanned from the scanner 100. In this case, since a large amount of high-resolution data need not be transferred, this results in high-speed processing and simplified control. When high-resolution data is output from the host computer to the raster image memory unit 700 shown in FIG. 14, image data can be sent at high speed through the GP-IB interface of the I/F controller 420 in the host computer.

Upon completion of the image replacement, raster image data, which is not to be replaced, is read out from the hard disk, and is supplied to the raster image memory unit 700 in the image memory synthesizing device 200 through the GP-IB interface together with information such as layout position information, image size, category information., and the like of the image data. Thus, these data are registered in the rester image memory unit 700 as in the fourth embodiment.

When data for one page are prepared in the image memory synthesizing device 200, a CPU 405 of the host computer 400 supplies a PDL/raster image synthesizing command GPRINT to the image memory synthesizing device 200.

In response to this command, a main controller of the image memory synthesizing device 200 can synthesize two systems of images, i.e., a character image (binary image) and a natural image (color multi-value image) in the same procedure as in the fourth embodiment using a PDL raster/raster image synthesizing controller 800, and can output the synthesized image.

Figure 17:
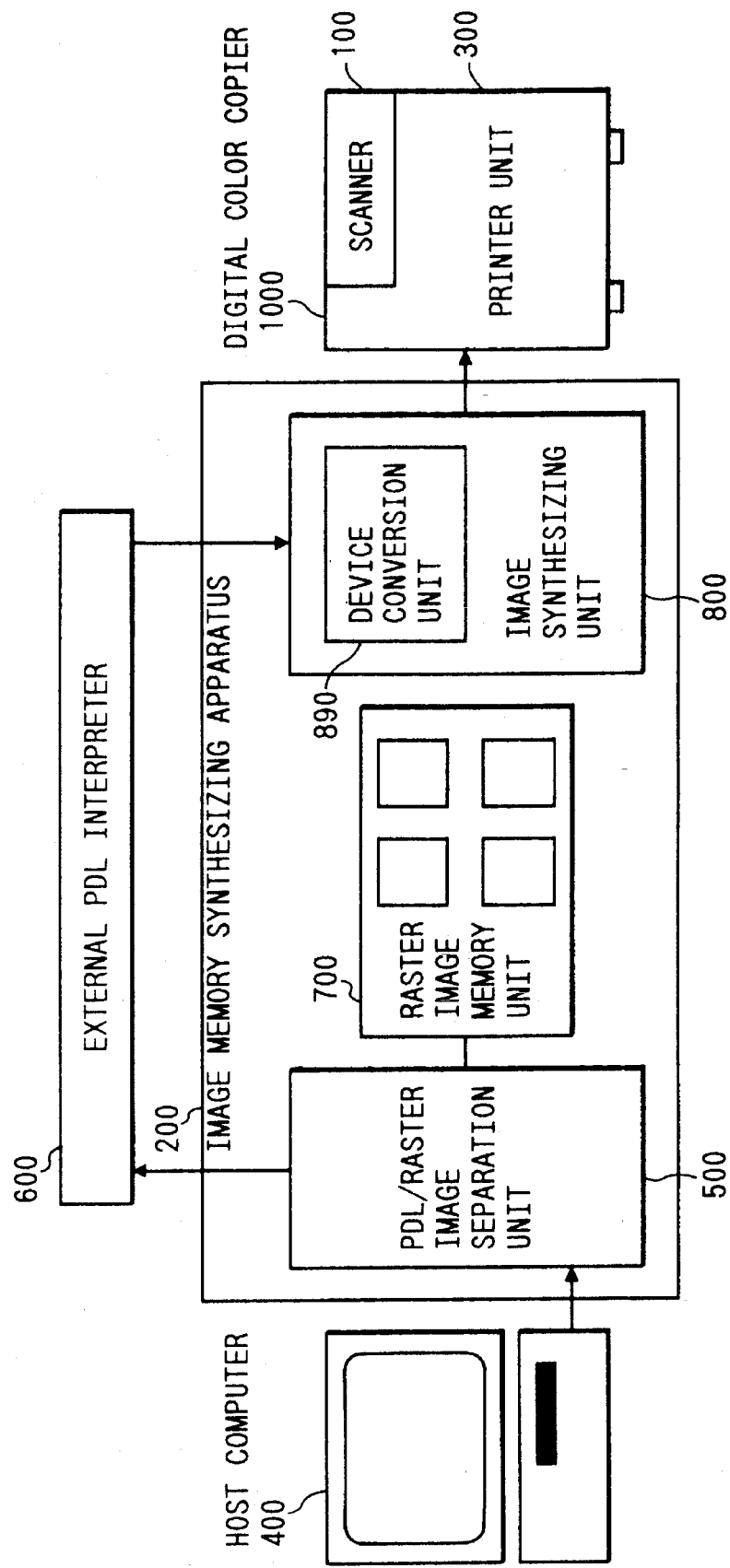
FIG. 17 is a diagram showing the arrangement of a system according to the sixth embodiment of the present invention.
Figure 18:
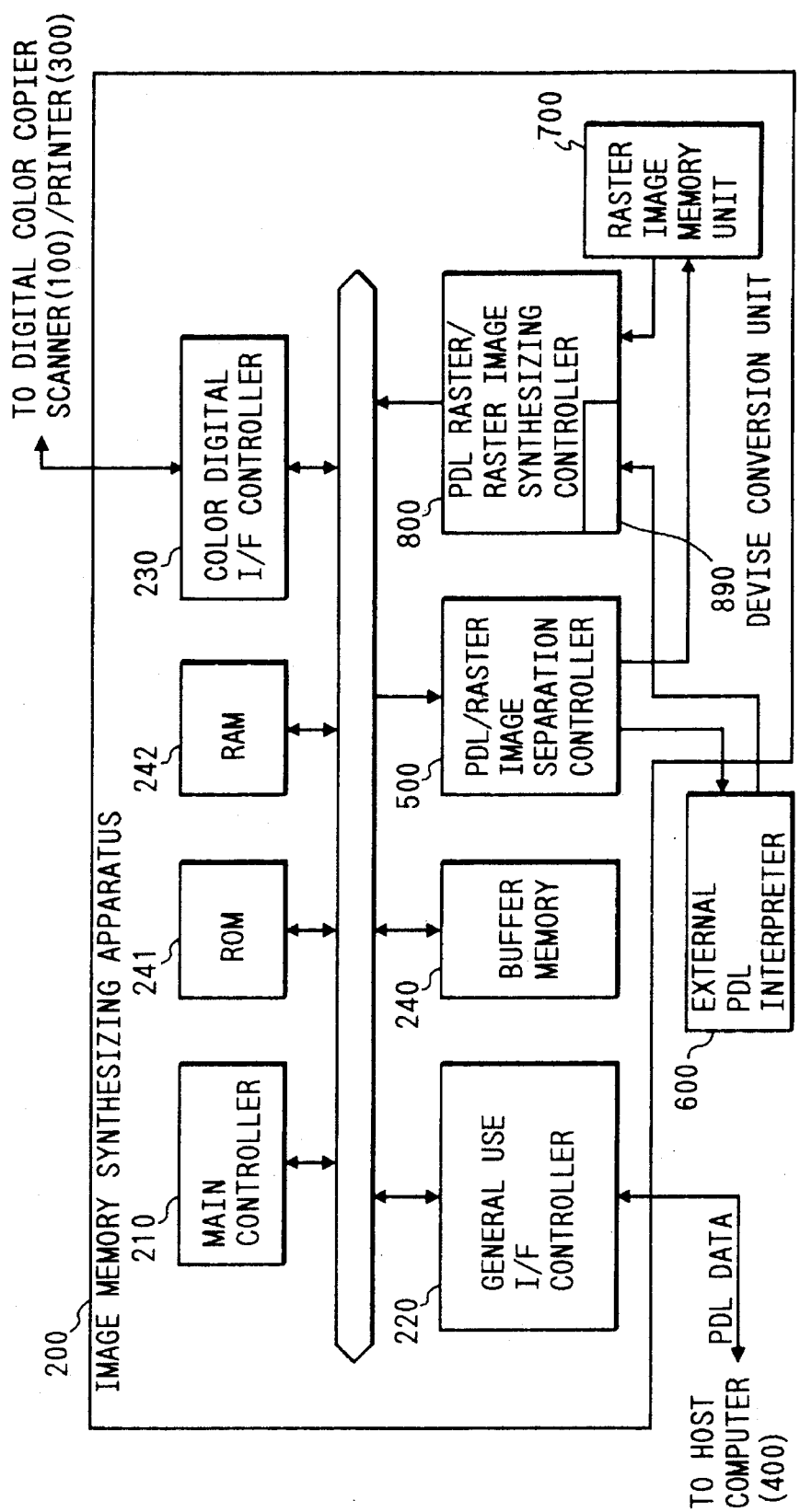
FIG. 18 is a block diagram of an image memory synthesizing device of the sixth embodiment.

FIGS. 17 and 18 respectively show the arrangement of a color image producing/output system according to the sixth embodiment of the present invention, and functional blocks of an image memory synthesizing device 200.

A difference from the fourth embodiment will be described below.

In this embodiment, raster image development of PDL codes, which is performed in the image memory synthesizing device 200 in the fourth embodiment, is performed by utilizing a PDL interpreter outside the image memory synthesizing device 200, and a device conversion unit 890 for enlarging/reducing a PDL raster developed image from the external PDL interpreter to the resolution of an output device is arranged, thus simplifying the arrangement of the image memory synthesizing device. In addition, another external PDL interpreter can be utilized.

In this embodiment, a user lays out a document and various image data (an illustration produced based on vector data, a natural image scanned by a scanner, and the like) using a mouse 431 and a keyboard 441 of a computer 400 as in the fourth embodiment, thereby generating an arbitrary document image while confirming the image on a display 412.

When the layout operations are finished, various kinds of information of the layout image stored in a hard disk 451, as described above, are converted into PDL codes for defining a document generated by the layout operation by a device driver software program in a ROM.

As described above, the converted PDL codes includes vector system information such as characters, illustrations, and the like, and raster image data such as a layout natural image. The computer 400 causes an I/F controller 420 to communicate with an external I/F controller 220 in the image memory synthesizing device 200, and transfers the PDL codes to the image memory synthesizing device 200.

The PDL codes supplied to the image memory synthesizing device 200 are separated into vector system PDL commands, raster image data, and information such as a position by a PDL/raster image separation controller as in the fourth embodiment. The raster system image data is supplied to the above-mentioned raster image memory unit 700, and is processed in the same manner as in the fourth embodiment. The vector system PDL commands are supplied to an external PDL interpreter unit 600 shown in FIG. 17, and a PDL image for one page is developed on a PDL raster image memory 640 in the PDL interpreter unit as a binary image as in the fourth embodiment.

Like in the fourth embodiment, a scanner 100 of a digital color copier is controlled by the host computer 400 to scan an original to be laid out at a high resolution, and the scanned image is registered in the raster image memory unit 700 in the image memory synthesizing device 200. This operation is repeated in correspondence with the number of required images.

As has already been described in the fourth embodiment, all the layout positions, image file names, image sizes, and category information stored in the hard disk are read out, and are displayed as a list on a display.

From this list, image data to be replaced with an image input from the scanner is selected, and an image to be used is selected from the list of images already registered in the raster image memory unit 700. Thus, a low-resolution image laid out on the host computer can be replaced with a high-resolution image scanned from the scanner 100. In this case, since a large amount of high-resolution data need not be transferred, this results in high-speed processing and simplified control.

When data for one page are prepared in the image memory synthesizing device 200 and the external PDL interpreter unit, a CPU 405 of the host computer 400 supplies a PDL/raster image synthesizing command GPRINT to the image memory synthesizing device 200.

In response to this command, a main controller of the image memory synthesizing device 200 supplies a one-page output command to the external interpreter unit 600 through a PDL/raster image separation controller 500. When an image output command is supplied from the external PDL interpreter unit to a PDL/raster image synthesizing controller 800, the device conversion unit 890 enlarges/reduces the external PDL developed image to the output resolution of a digital color copier 1000. Thus, two systems of images, i.e., a character image (binary image) and a natural image (color multi-value image) can be synthesized and output in the same procedure as in the fourth embodiment.

Note that the device conversion unit 890 has a buffer memory, and can perform enlargement/reduction by controlling the read/write relations of the buffer memory.

Figure 19:
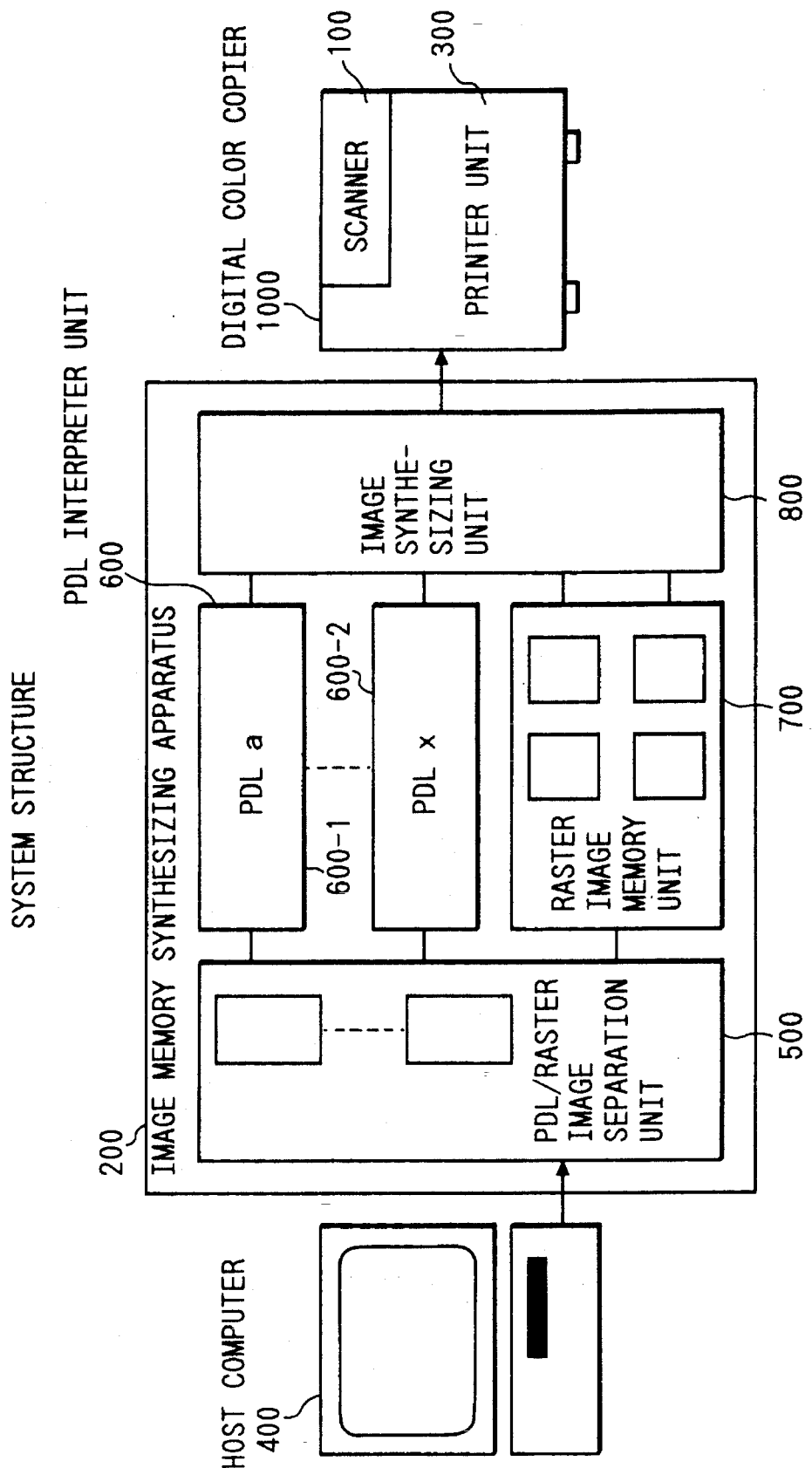
FIG. 19 is a diagram showing the arrangement of a system according to the seventh embodiment of the present invention.
Figure 20:
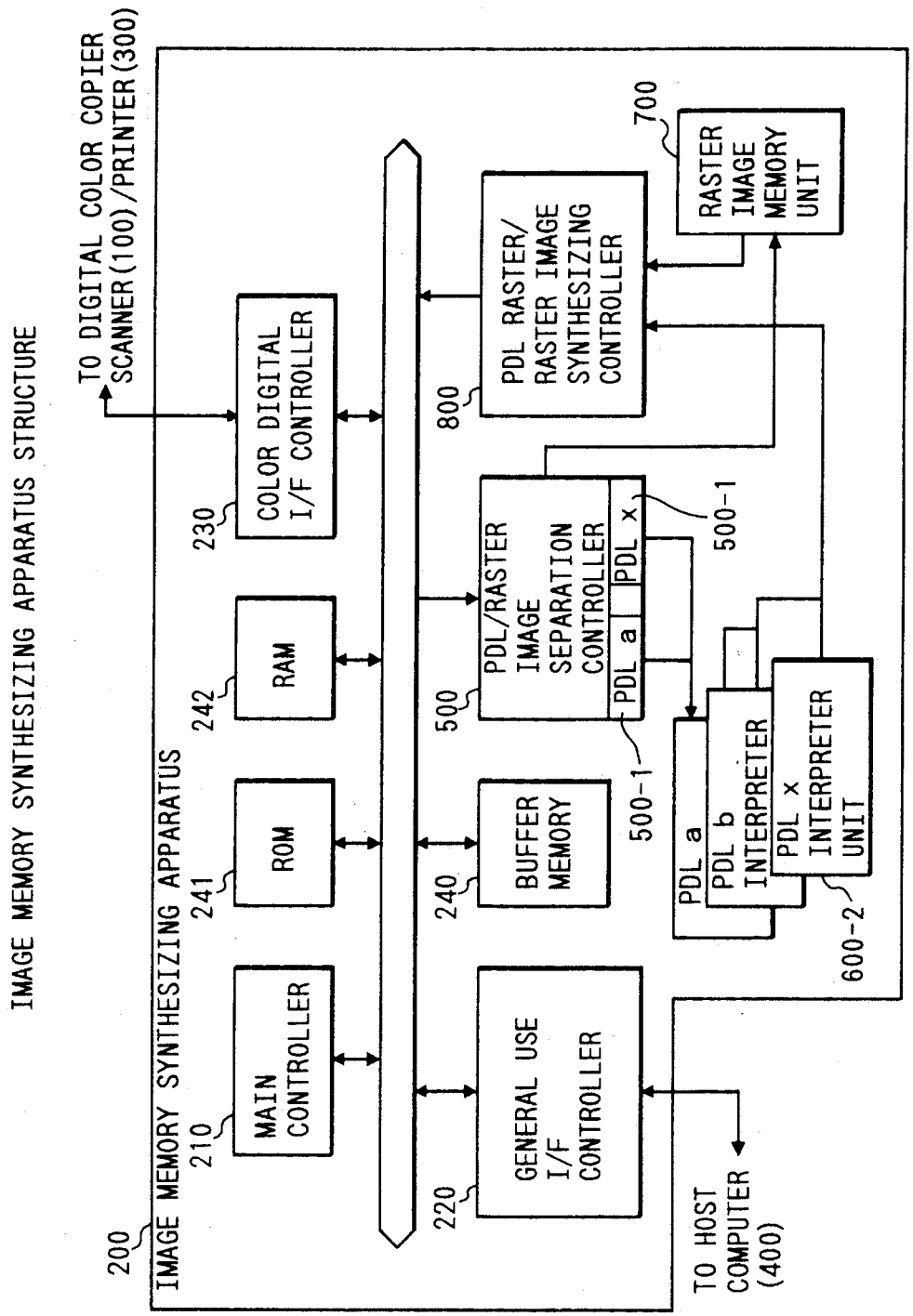
FIG. 20 is a block diagram of an image memory synthesizing device of the seventh embodiment.

FIGS. 19 and 20 respectively show the arrangement of a color image producing/output system according to the seventh embodiment of the present invention, and functional blocks of an image memory synthesizing device 200.

A difference from the fourth embodiment will be described below.

In this embodiment, raster image development of PDL codes, which is performed in the image memory synthesizing device 200 in the fourth embodiment, is performed as follows. That is, a plurality of PDL interpreter units are prepared in the image memory synthesizing device 200 so as to cope with a plurality of PDL interpreters, thereby allowing processing of various types of PDL commands.

Thus, various types of PDL commands converted by a host computer 400 can be coped with, and various PDLs registered in an external storage medium can be output through the host computer.

In this embodiment, various kinds of information of a stored layout image are converted into PDL codes for defining a document generated by a layout operation on the computer 400 as in the fourth embodiment. The converted PDL codes can be converted not only into one type of PDL commands but also to other types of PDL commands by changing device drivers. Other PDL codes registered on external storage media may be fetched and output by the host computer.

Therefore, in order to cope with these plurality of types of PDL commands, this embodiment comprises a plurality of PDL interpreters.

The PDL codes generated in this manner are transferred from the host computer to a PDL/raster image separation controller 500 in the same procedure as in the fourth embodiment. The PDL/raster image separation controller 500 discriminates a content based on the transferred PDL codes, and determines the type of PDL codes, i.e., one of internal PDL interpreters 600-1, . . . , 600-2. The controller 500 performs processing using one of PDL/raster image separation units 500-1, . . . , 500-2 according to the determined type of PDL codes.

As in the fourth embodiment, a scanner 100 of a digital color copier is controlled by the host computer 400 to scan an original to be laid out at a high resolution, and the scanned image is registered in a raster image memory unit 700 in the image memory synthesizing device 200. This operation is repeated in correspondence with the number of required images.

As has already been described in the fourth embodiment, all the layout positions, image file names, image sizes, and category information stored in the hard disk are read out, and are displayed as a list on a display.

From this list, image data to be replaced with an image input from the scanner is selected, and an image to be used is selected from the list of images already registered in the raster image memory unit 700. Thus, a low-resolution image laid out on the host computer can be replaced with a high-resolution image scanned from the scanner 100. In this case, since a large amount of high-resolution data need not be transferred, this results in high-speed processing and simplified control.

Thereafter, the same processing as in the fourth embodiment is performed in the corresponding PDL interpreter unit. Finally, two systems of images, i.e., a character image (binary image) and a natural image (color multi-value image) can be synthesized and output in the same procedure as in the fourth embodiment.

In the above-mentioned embodiment, as different interfaces, the Apple Talk and GP-IB interfaces are used. However, the present invention is not limited to these interfaces. For example, other interfaces, e.g., a CapSL interface, an SCSI interface, and the like may be used.

The PDL in this embodiment may be a language called "Postscript", but may be another language, e.g., a language called "PCL".

A command image data portion indicates data other than raster image data such as code data representing characters, data representing colors, and the like for transferring data in units of pixels. When a multi-value image memory is used as a memory for storing raster image data in this embodiment, and a color binary image memory is used for command image data, both binary data and multi-value data described in a PDL can be subjected to synthesizing processing as color images.

In the above embodiments, as shown in FIGS. 7 and 14, the PDL interpreter unit 600 and the raster image memory unit 700 are arranged in a single housing. However, the present invention is not limited to this. For example, these units may be arranged as separate devices.

As described above, according to the above embodiments, high image quality can be obtained, and the data processing speed can be increased.

What is claimed is:

1. An image processing system comprising:
   a) a plurality of image signal generation sources each including a page description language data;
   b) synthesizing means for synthesizing image signals from said plurality of image signal generation sources, wherein said synthesizing means formulates the page description language data into images, and then synthesizes the images; and c) output means for outputting to a printer the image signal synthesized by said synthesizing means.

2. A system according to claim 1, wherein said printer comprises an electrophotography system printer.

3. A system according to claim 1, wherein said plurality of image signal generation sources are separately arranged.

4. A system according to claim 3, wherein said synthesizing means is incorporated in one of said plurality of image signal generation sources.

5. A system according to claim 1, wherein said image signal is a multi-value color image signal.

6. A system according to claim 1, wherein said synthesizing means includes a formulating means for formulating the page description language data into the image.

7. An image processing apparatus comprising:

a) generation means for generating a first image signal developed from a page description language data;

b) input means for externally inputting a second image signal;

c) synthesizing means for synthesizing the first image signal and the second image signal; and d) output means for outputting to a printer engine the image signal synthesized by said synthesizing means.

8. An apparatus according to claim 7, wherein said second image signal is a multi-value color image signal.

9. An apparatus according to claim 8, wherein said first image signal is a binary color image signal.

10. An apparatus according to claim 9, wherein said synthesizing means synthesizes the multi-value color image signal and the binary color image signal, and outputs the synthesized image signal.

11. An apparatus according to claim 7, wherein the number of pins of an input terminal of said input means is the same as the number of pins of an output terminal of said output means.

12. An image processing system comprising:

a) input means for inputting data expressed by a page description language data; and b) replacing means for replacing raster image data included in the data expressed by the page description language data with raster image data input from another input means, and outputting the obtained raster image data.

13. A system according to claim 12, wherein said another input means comprises original reading means.

14. A system according to claim 12, further comprising:

a) a formulating means for formulating command data included in the data expressed by the page description language data into an image for deriving a raster image data; and b) synthesizing means for synthesizing the raster image data derived by said formulating means with another raster image data derived by said replacing means.

15. A system according to claim 12, wherein the raster image data input from said another input means is color raster image data.

16. A system according to claim 14, further comprising an output means for outputting to a printer the raster image data derived by said synthesizing means.

17. An image processing method comprising the steps of:

separating raster image data and command data of a page description language data; and outputting the separated raster image data and command data through different interfaces, respectively.

18. A method according to claim 17, wherein said command data is output through an Apple Talk interface.

19. A method according to claim 17, wherein said raster image data is output through a GP-IB interface.

20. A method according to claim 17, wherein said raster image data is output through an SCSI interface.

21. An image processing apparatus comprising:

a) input means for inputting a page description language data;

b) separating means for separating raster image data and command data described in the page description language data; and c) output means for outputting the separated raster image data and command data through different interfaces, respectively.

22. An apparatus according to claim 21, wherein the command data is output through an Apple Talk interface.

23. An apparatus according to claim 21, wherein the raster image is output through a GP-IB interface.

24. An apparatus according to claim 21, wherein the raster image data is output through an SCSI interface.

25. An apparatus according to claim 21, wherein said output means outputs data to a printer.

* * * * *

UNITED STATES PATENT AND TRADEMARK OFFICE
CERTIFICATE OF CORRECTION

PATENT NO. : 5,465,165

DATED : November 7, 1995

INVENTORS : Tanio et al.                                          Page 1 of 3

It is certified that error appears in the above-identified patent and that said Letters Patent is hereby corrected as shown below:

Title page,
AT [75] INVENTORS

"Staoshi Tanio," should read --Satoshi Tanio,--.
Title page,
AT [56] REFERENCES CITED U.S. Patent Documents,
      "4,675,745 6/1987 Riseman et al." should read
      --4,675,743 6/1987 Riseman et al.--.
  Title page,
  Foreign Patent Documents,
      "2296465 5/1989 Japan
       1278167 1/1990 Japan" should read
      --1-278167 11/1989 Japan
       2-296465 12/1990 Japan--.

IN THE DRAWINGS

Sheet 6, Figure 8, "CREANING" should read --CLEANING--.

Sheet 14, Figure 16, "APPLO" should read --APPLE--.

COLUMN 3

Line 20, "Output" should read --output--,

UNITED STATES PATENT AND TRADEMARK OFFICE
CERTIFICATE OF CORRECTION

PATENT NO. : 5,465,165

DATED : November 7, 1995

INVENTORS : Tanio et al.

Page 2 of 3

It is certified that error appears in the above-identified patent and that said Letters Patent is hereby corrected as shown below:

COLUMN 8

Line 10, "Position/category" should read
--position/category--.
Line 48, "synthesized.," should read --synthesized,--.
Line 55, "thee" should read --the--.

COLUMN 9

Line 2, "device 200 is arranged.-- should read
--device 200.--

COLUMN 10

Line 58, "as-the" should read --as the--.

COLUMN 13

Line 62, "information.," should read --information,--.
Line 64, "rester" should read --raster--.

UNITED STATES PATENT AND TRADEMARK OFFICE
CERTIFICATE OF CORRECTION

PATENT NO. : 5,465,165

DATED : November 7, 1995

INVENTORS : Tanio et al.

It is certified that error appears in the above-identified patent and that said Letters Patent is hereby corrected as shown below:

COLUMN 18

Line 18, "and outputting" should read --and ¶ outputting--.

Signed and Sealed this

Seventh Day of May, 1996

Attest:

BRUCE LEHMAN

Attesting Officer

Commissioner of Patents and Trademarks